(12) United States Patent
Utagawa

(10) Patent No.: US 7,732,744 B2
(45) Date of Patent: Jun. 8, 2010

(54) IMAGE INPUT APPARATUS, PHOTODETECTION APPARATUS, AND IMAGE SYNTHESIS METHOD

(75) Inventor: Ken Utagawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 192 days.

(21) Appl. No.: 11/993,758

(22) PCT Filed: Jun. 22, 2006

(86) PCT No.: PCT/JP2006/312505

§ 371 (c)(1),
(2), (4) Date: Dec. 21, 2007

(87) PCT Pub. No.: WO2006/137481

PCT Pub. Date: Dec. 28, 2006

(65) Prior Publication Data

US 2009/0140131 A1   Jun. 4, 2009

(30) Foreign Application Priority Data

Jun. 23, 2005   (JP) ............................... 2005-183729

(51) Int. Cl.
*H01J 5/16* (2006.01)
*H04N 5/225* (2006.01)
(52) U.S. Cl. ...................... 250/208.1; 348/340; 396/334
(58) Field of Classification Search ............... 250/208.1, 250/216; 348/340; 396/322, 333, 334
See application file for complete search history.

(56) References Cited

U.S. PATENT DOCUMENTS

| 5,076,687 A | 12/1991 | Adelson |
| 2003/0048394 A1 | 3/2003 | Okuwaki et al. |
| 2004/0125230 A1 | 7/2004 | Suda |
| 2007/0230944 A1* | 10/2007 | Georgiev .................... 396/322 |
| 2007/0252074 A1* | 11/2007 | Ng et al. .................. 250/208.1 |
| 2008/0165270 A1* | 7/2008 | Watanabe et al. ........... 348/340 |

(Continued)

FOREIGN PATENT DOCUMENTS

JP   2001-211418   8/2001

(Continued)

OTHER PUBLICATIONS

Ng et al. "Light Field Photography with a Hand-held Plenoptic Camera", Stanford Tech Report CTSR 2005-02, pp. 1-11, Feb. 2005.

*Primary Examiner*—John R Lee
(74) *Attorney, Agent, or Firm*—Ditthavong Mori & Steiner, P.C.

(57) ABSTRACT

An image input apparatus includes an imaging optical system, a microlens array having a plurality of microlenses two-dimensionally arrayed with a predetermined pitch in the vicinity of a focal plane of the imaging optical system, and a photoreceptor array having a plurality of photoreceptors for each of the microlenses, each of the photoreceptors receiving bundles of rays passing through one of different exit-pupil regions of the imaging optical system. A power of the microlens and a gap between the microlens array and the photoreceptor array are determined so that a cross-sectional dimension of the bundles of rays for forming an image of each of the photoreceptors related to the microlens is equal to or smaller than the pitch of the microlens, within a range from the microlens array to a predetermined distance.

9 Claims, 22 Drawing Sheets

U.S. PATENT DOCUMENTS

| | | | |
|---|---|---|---|
| 2008/0187305 A1* | 8/2008 | Raskar et al. | 396/268 |
| 2008/0266655 A1* | 10/2008 | Levoy et al. | 359/368 |
| 2009/0027542 A1* | 1/2009 | Yamamoto et al. | 348/340 |
| 2009/0102956 A1* | 4/2009 | Georgiev | 348/315 |
| 2009/0128669 A1* | 5/2009 | Ng et al. | 348/241 |
| 2009/0140131 A1* | 6/2009 | Utagawa | 250/226 |
| 2009/0185801 A1* | 7/2009 | Georgiev et al. | 396/332 |
| 2009/0190022 A1* | 7/2009 | Ichimura | 348/340 |
| 2009/0190024 A1* | 7/2009 | Hayasaka et al. | 348/360 |

FOREIGN PATENT DOCUMENTS

| | | |
|---|---|---|
| JP | 2003-084259 | 3/2003 |
| JP | 2003-141529 | 5/2003 |
| JP | 2004-096358 | 3/2004 |
| JP | 2004-191893 | 7/2004 |
| WO | WO 2005055592 | 6/2005 |

* cited by examiner (a)

(b)

IMAGE INPUT APPARATUS, PHOTODETECTION APPARATUS, AND IMAGE SYNTHESIS METHOD

TECHNICAL FIELD

The present invention relates to an image input apparatus, a photodetection apparatus, and an image synthesis method, for acquiring an image focused at a desired distance with the same photographic field.

BACKGROUND ART

To obtain an image focused at a desired distance with the same photographic field after shooting with a typical camera (Patent Document 1), it is necessary to perform shooting repeatedly while the focus of a photographic lens of the camera is shifted, and acquire a plurality of image data sets at different shooting distances. Meanwhile, a technique is known (Non-Patent Document 1) which can form a synthetic image focused at a desired distance with the same photographic field after shooting by using data obtained by one shooting.

Patent Document 1: Japanese Laid-Open Patent Publication No. 2001-211418

Non-Patent Document 1: Ren Ng and five others, "Light Field Photography with a Hand-held Plenoptic Camera", [online], Stanford TechReport CTSR 2005-02, [searched Jun. 14, 2006], Internet http://graphics.stanfbrd.edu/papers/libamera/libamera-15 0dpi.pdf>

DISCLOSURE OF INVENTION

Problems to be Solved by the Invention

However, when forming such a synthetic image focused at the desired distance after shooting by using the data obtained by one shooting, the synthetic image is desired to be sharp.

Means for Solving the Problems

According to a first aspect of the present invention, an image input apparatus includes an imaging optical system, a microlens array having a plurality of microlenses two-dimensionally arrayed with a predetermined pitch in the vicinity of a focal plane of the imaging optical system, and a photoreceptor array having a plurality of photoreceptors for each of the microlenses. Each of the photoreceptors receives bundles of rays passing through one of different exit-pupil regions of the imaging optical system. A power of the microlens and a gap between the microlens array and the photoreceptor array are determined so that a cross-sectional dimension of the bundles of rays for forming an image of each of the photoreceptors related to the microlens is equal to or smaller than the pitch of the microlens, within a range from the microlens array to a predetermined distance.

Preferably, according to a second aspect of the present invention, in the image input apparatus of the first aspect, the predetermined distance may correspond to a gap between the microlens array and a plane in which a pitch of the image of the photoreceptor is equal to the pitch of the microlens when the photoreceptors are projected toward the imaging optical system through the microlens.

Preferably, according to a third aspect of the present invention, the image input apparatus of the first or second aspect may further include an image synthesis unit that generates a synthetic image in an image plane at a desired position within the range to the predetermined distance, based on photoreception signals obtained by the plurality of photoreceptors.

Preferably, according to a fourth aspect of the present invention, in the image input apparatus of the third aspect, the photoreceptor array may have color filters of a plurality of colors for the plurality of photoreceptors, and the image synthesis unit may generate the synthetic image related to the color having the highest density among the colors of the color filters.

Preferably, according to a fifth aspect of the present invention, in the image input apparatus of the third or fourth aspect, the image synthesis unit may generate the synthetic image by determining weighting of the photoreception signals in accordance with the position within the range to the predetermined distance.

Preferably, according to a sixth aspect of the present invention, the image input apparatus of the first or second aspect may further include an image synthesis unit that generates a synthetic image corresponding to a desired F-number of the imaging optical system, based on photoreception signals obtained by the plurality of photoreceptors.

Preferably, according to a seventh aspect of the present invention, in the image input apparatus of the sixth aspect, the photoreceptor array may have color filters of a plurality of colors for the plurality of photoreceptors, and the image synthesis unit may generate the synthetic image related to a color having the highest density among the colors of the color filters.

Preferably, according to an eighth aspect of the present invention, in the image input apparatus of the sixth or seventh aspect, the image synthesis unit may generate the synthetic image by determining weighting of the photoreception signals in accordance with the F-number.

According to a ninth aspect of the present invention, an image input apparatus includes an imaging optical system, a microlens array having a plurality of microlenses two-dimensionally arrayed with a predetermined pitch in the vicinity of a focal plane of the imaging optical system, a photoreceptor array having a plurality of photoreceptors for each of the microlenses, each of the photoreceptors receiving bundles of rays passing through one of different exit-pupil regions of the imaging optical system, color filters that provide different spectral sensitivity characteristics for the plurality of photoreceptors, and an image synthesis unit that generates a synthetic image in an image plane determined at a desired position within a range from the microlens to a predetermined distance, based on photoreception signals obtained by the photoreceptors, related to the color having the highest density among the colors of the color filters.

According to a tenth aspect of the present invention, a photodetection apparatus includes an imaging optical system, a microlens array having a plurality of microlenses two-dimensionally arrayed with a predetermined pitch in the vicinity of a focal plane of the imaging optical system, a photoreceptor array having a plurality of photoreceptors for each of the microlenses, each of the photoreceptors receiving bundles of rays passing through one of different exit-pupil regions of the imaging optical system, and an arithmetic unit that obtains a light amount of the bundles of rays incident on a region optionally set in an optical path of the imaging optical system, based on a solid angle of the incident bundles of rays and photoreception signals of the photoreceptors corresponding to the solid angle.

According to an eleventh aspect of the present invention, a photodetection apparatus includes an imaging optical system, a microlens array having a plurality of microlenses two-dimensionally arrayed with a predetermined pitch in the vicinity of a focal plane of the imaging optical system, a photoreceptor array having a plurality of photoreceptors for each of the microlenses, each of the photoreceptors receiving bundles of rays passing through one of different exit-pupil regions of the imaging optical system, and an arithmetic unit that interpolates and obtains a light amount corresponding to a position between images that are formed by projecting the plurality of photoreceptors toward the imaging optical system through the microlens, based on photodetection signals obtained by the plurality of photoreceptors.

According to a twelfth aspect of the present invention, a photodetection apparatus includes an imaging optical system, a first microlens array having a plurality of microlenses two-dimensionally arrayed with a predetermined pitch in the vicinity of a focal plane of the imaging optical system, a photoreceptor array having a plurality of photoreceptors for each of the first microlenses, each of the photoreceptors receiving bundles of rays passing through one of different exit-pupil regions of the imaging optical system, and a second microlens array having a plurality of microlenses for the plurality of photoreceptors. The microlenses of the second microlens array are arranged to deflect with respect to the plurality of photoreceptors in accordance with a positional relationship between one of the microlenses of the first microlens array and each of the microlenses of the second microlens array.

According to a thirteenth aspect of the present invention, an image synthesis method comprising the step of generating a synthetic image in an image plane located at a desired position based on photoreception signals obtained by the plurality of photoreceptors of the image input apparatus of the first aspect, by using a synthesis method that is changed in accordance with the desired position within the predetermined range.

Preferably, according to a fourteenth aspect of the present invention, in the image synthesis method of the thirteenth aspect, the synthetic image may be generated by determining weighting of the photoreception signals in accordance with the position within the predetermined range.

According to a fifteenth aspect of the present invention, a photodetection method includes the steps of receiving bundles of rays passing through different exit-pupil regions of an imaging optical system by a plurality of photoreceptors through a plurality of microlenses arrayed with a predetermined pitch in the vicinity of a focal plane of the imaging optical system, and obtaining a light amount of bundles of rays incident on a region optionally set in an optical path of the imaging optical system, based on a solid angle of the bundles of rays incident on the region and photoreception signals obtained by the photoreceptors corresponding to the solid angle.

According to a sixteenth aspect of the present invention, an image acquisition method includes the steps of providing a microlens array having a plurality of microlenses two-dimensionally arrayed with a predetermined pitch in the vicinity of a focal plane of an imaging optical system, providing a photoreceptor array having a plurality of photoreceptors for each of the microlenses, each of the photoreceptors receiving bundles of rays passing through one of different exit-pupil regions of the imaging optical system, determining a power of the microlens and a gap between the microlens array and the photoreceptor array so that a cross-sectional dimension of the bundles of rays for forming an image of each of the photoreceptors related to the microlens is equal to or smaller than the pitch of the microlens, within a range from the microlens array to a predetermined distance, and acquiring an image based on an output from the photoreceptor array.

ADVANTAGEOUS EFFECT OF THE INVENTION

With the present invention, a sharp synthetic image focused at a desired distance can be formed after shooting by using data obtained by one shooting.

BEST MODE FOR CARRYING OUT THE INVENTION

First Embodiment

A first embodiment is described below. This embodiment is for an image-capturing apparatus such as a digital camera (an electronic camera), and an image synthesis method using the image-capturing apparatus. This image-capturing apparatus is also referred to as an image input apparatus, an image acquisition apparatus, or a photodetection apparatus (a light detection device).

Figure 1:
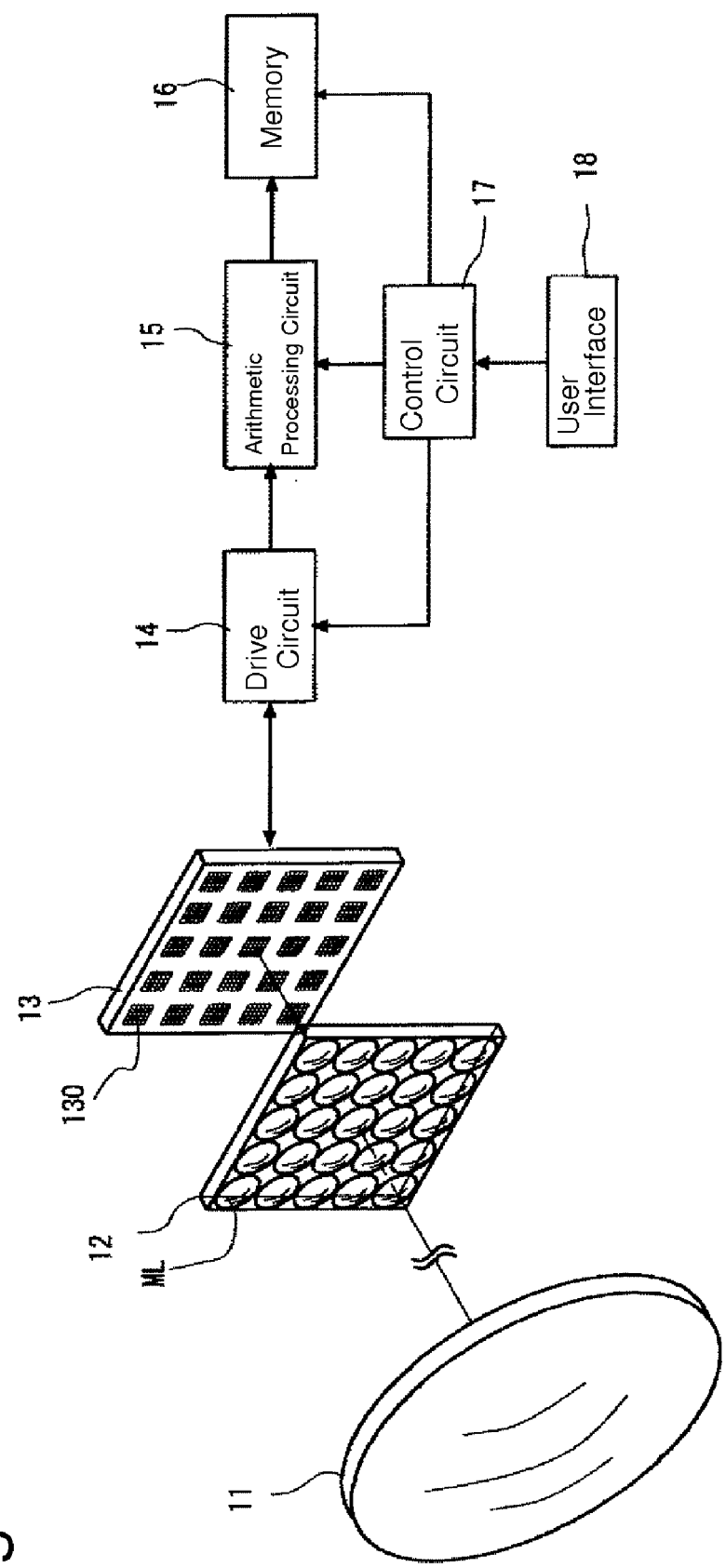
FIG. 1 is a block diagram showing an image-capturing apparatus.

First, the configuration of the image-capturing apparatus is described. FIG. 1 is a block diagram showing the image-capturing apparatus. As shown in FIG. 1, the image-capturing apparatus includes a photographic lens (corresponding to an imaging optical system) 11, a microlens array (corresponding to a plurality of positive lenses) 12, an image sensor (an image-capturing element) 13, a drive circuit 14, an arithmetic processing circuit (corresponding to synthesis means) 15, a memory 16, a control circuit 17, a user interface 18, and the like.

The photographic lens 11 converges bundles of rays from a photographic field, in the vicinity of a focal plane. In the vicinity of the focal plane, the microlens array 12 and the image sensor 13 are disposed in that order. In FIG. 1, while a gap between the microlens array 12 and the image sensor 13 is illustrated as a large gap, the gap is actually small and these components are closely arranged.

The bundles of rays incident in the vicinity of the focal plane of the photographic lens 11 are converted into an electric signal by the image sensor 13. The image sensor 13 is driven by the drive circuit 14, and an output signal from the image sensor 13 is acquired by the arithmetic processing circuit 15 through the drive circuit 14. The arithmetic processing circuit 15 forms (generates) synthetic image data in the photographic field based on the output signal. The synthetic image data is stored in the memory 16.

Also, the above-described drive circuit 14, the arithmetic processing circuit 15, and the memory 16 are controlled by the control circuit 17. The control of the control circuit 17 is based on an instruction input by a user through the user interface 18. The user can designate the timing of shooting (taking a picture or photographing) for the image-capturing apparatus through the user interface 18.

In this embodiment, the user can designate an object position (distance) to be focused for image synthesis, and an aperture value (F-number) for image synthesis, after shooting (or designation may be of course made before shooting or during shooting). Hereinafter, the designated object position is referred to as a "designated image plane", and the designated aperture value is referred to as a "designated aperture value (F-number)".

Next, an optical system portion of the image-capturing apparatus will be briefly described. The microlens array 12 has a plurality of microlenses ML with a positive power, the microlenses ML being two-dimensionally arrayed. In FIG. 1, while there are five microlenses ML in a vertical direction and five microlenses ML in a horizontal direction for convenience of illustration, the number of microlenses ML (the array density) may be suitably determined in accordance with a resolution required for image data of the image-capturing apparatus. In this embodiment, the number of microlenses ML is 586×440.

The image sensor 13 has pixel arrays 130 arranged in an array pattern corresponding to the microlenses ML, to receive rays passing through the microlenses ML.

In the pixel arrays 130, openings of photoreceptors of photoelectric conversion elements may merely define "pixels", or light-converging microlenses may be provided on the photoelectric conversion elements so that openings of the microlenses define "pixels". Hereinafter, each of the photoelectric conversion elements is referred to as a "pixel", and the plurality of photoelectric conversion elements for receiving rays passing through the microlens ML are referred to as a "pixel array".

In each of the pixel arrays 130, there are three or more pixels in the vertical direction and three or more pixels in the horizontal direction. In FIG. 1, while the number of pixels in the vertical and horizontal directions (the pixel density) of each pixel array 130 is five each, the number of pixels may be suitably determined as required for the number of image planes (photographic distances) which can be designated by the user of the image-capturing apparatus (for example, the number of pixels may be 7×7=49).

Each of the pixel arrays 130 receives partial bundles of rays transmitted through the microlenses ML. Thus, cross-talk should be prevented from occurring between the adjacent pixel arrays 130.

Figure 2:
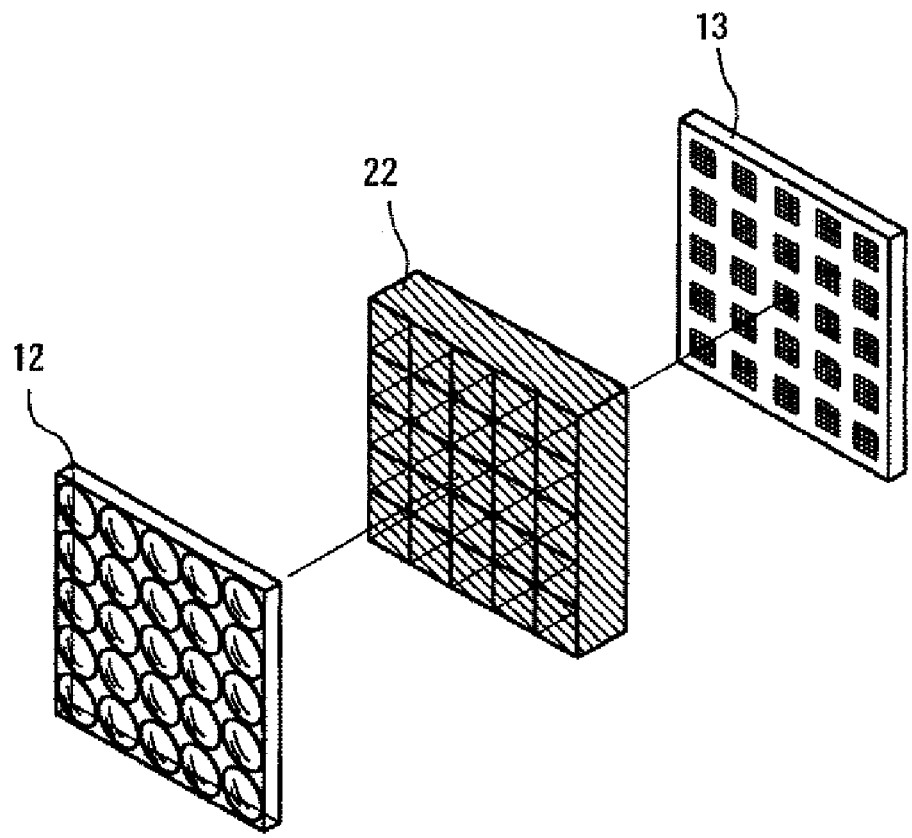
FIG. 2 is an illustration showing a partition member for preventing cross-talk.
Figure 3:
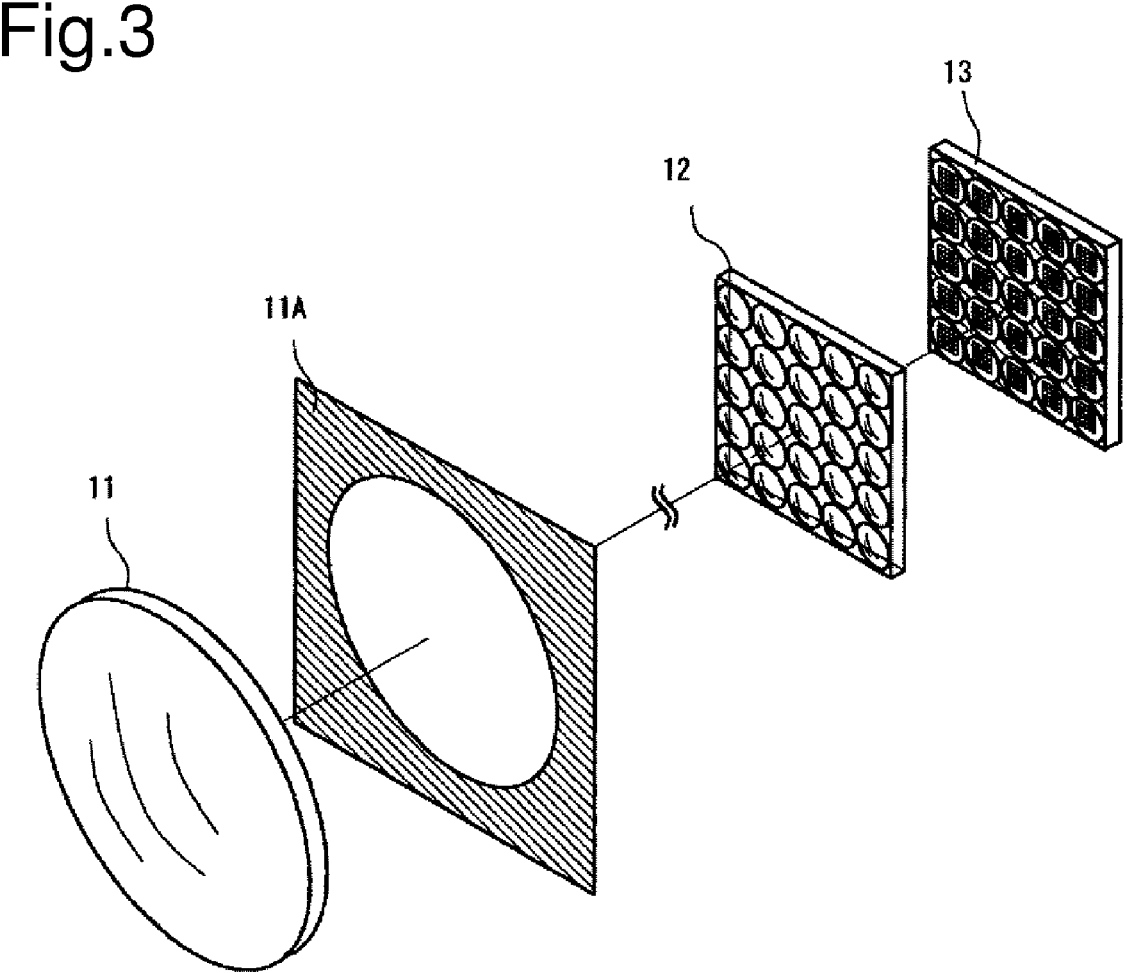
FIG. 3 is an illustration showing an aperture member 11A.

Therefore, as shown in FIG. 2, a partition member 22 may be preferably provided between the microlens array 12 and the image sensor 13. Alternatively, as shown in FIG. 3, an aperture member 11A with a circular opening of a proper size may be arranged in the rear of the photographic lens 11, instead of the partition member 22.

In the image-capturing apparatus, the size of the opening of the aperture member 11A does not have to be variable. This is because the aperture value of the photographic lens 11 of the image-capturing apparatus is varied by operation of the arithmetic processing circuit 15.

In the following description, the partition member 22 nor the aperture member 11A is no longer discussed, and the illustration is omitted.

Figure 4:
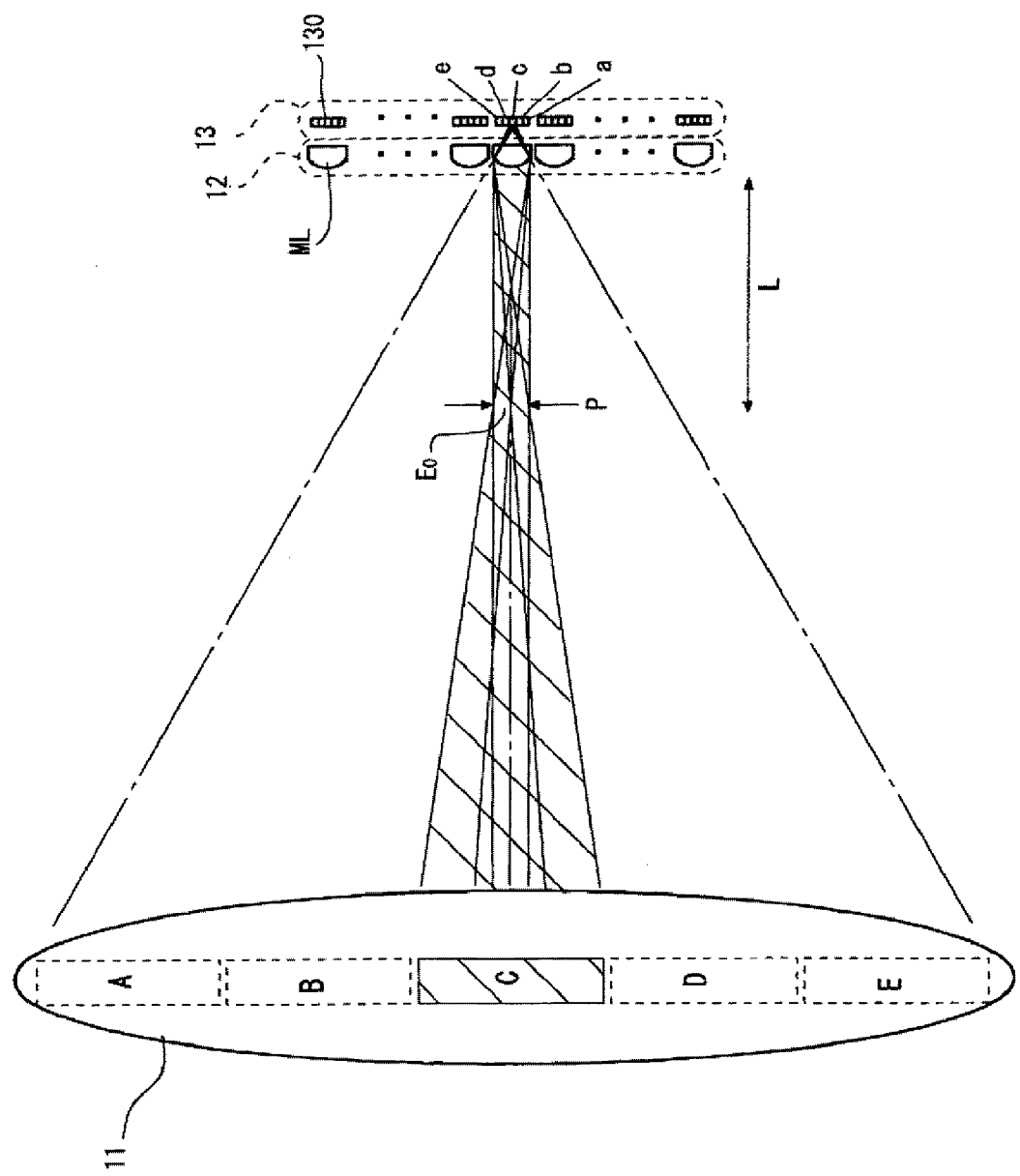
FIG. 4 is a cross-sectional view showing an optical system portion of the image-capturing apparatus cut along a plane including an optical axis.

Next, the optical system portion of the image-capturing apparatus will be described in detail. FIG. 4 is a cross-sectional view showing the optical system portion of the image-capturing apparatus cut along a plane including an optical axis (an optical axis of the photographic lens 11). Bundles of rays with hatching in FIG. 4 are bundles of rays incident on a pixel c located at the center of the pixel array 130 which is arranged in the vicinity of the optical axis.

As shown in FIG. 4, bundles of rays incident on the pixel c are bundles of rays transmitted through a sub-region C located in the vicinity of the center of a pupil of the photographic lens 11. Bundles of rays incident on a pixel b adjacent to the pixel c are bundles of rays transmitted through a sub-region B adjacent to the sub-region C of the pupil of the photographic lens 11. In a similar manner, bundles of rays incident on pixels a, b, c, d, and e in the single pixel array 130 are bundles of rays respectively transmitted through different sub-regions A, B, C, D, and E of the pupil of the photographic lens 11. The pupil mentioned here is an exit pupil of the photographic lens 11, and the sub-regions (the partial regions) represent sub-pupils (partial pupils) of the exit pupil.

FIG. 4 shows that bundles of rays passing through a region E0, which have a width similar to an array pitch P of the microlens ML, at a position located at a distance L from the front side of the microlens ML, is guided to the pixel c located in the rear of the microlens ML. At this time, the bundles of rays incident on the pixel c are bundles of rays in a column-like form having a diameter of about P within a depth L.

In other words, the power of the microlens ML and the distance between the microlens ML and the image sensor 13, etc., are determined so that the bundles of rays incident on the pixel c have a width similar to the array pitch P of the microlens ML at a position located at a distance L from the front side of the microlenses ML. In a similar manner, the bundles of rays incident on the pixels a, b, c, d, and e located around the pixel c are bundles of rays in a column-like form having a diameter of about P within the depth L.

The image-capturing apparatus can form synthetic image data of an image formed in a desired plane within the depth L at least with a resolution P. In other words, the depth L is a range that allows the image-capturing apparatus to form the synthetic image data at least with the resolution P. Thus, hereinafter, the depth L is referred to as a "synthesis range".

Next, an example design of each microlens ML will be described.

Figure 5:
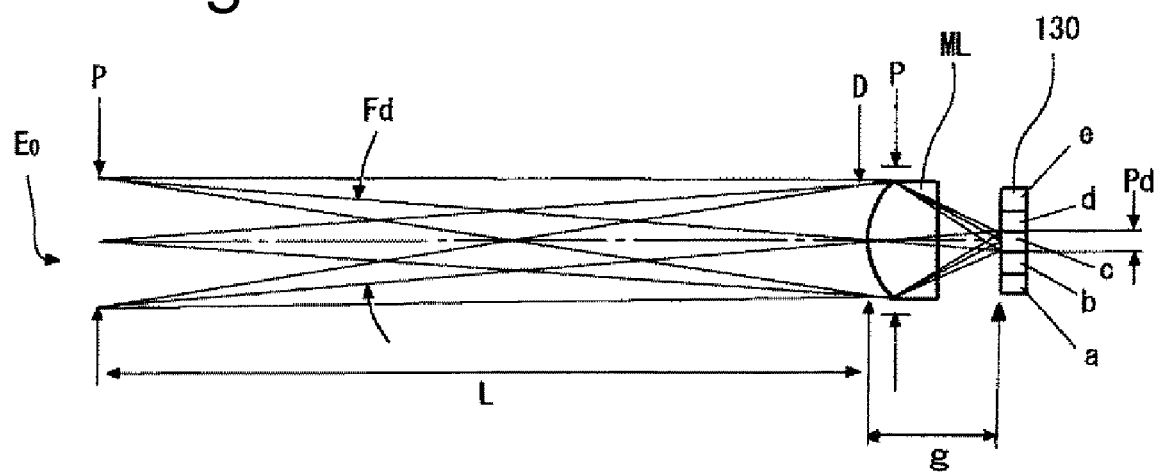
FIG. 5 is an enlarged illustration showing the details of bundles of rays incident on a pixel c.

FIG. 5 is an enlarged illustration showing the details of the bundles of rays incident on the pixel c through the microlens ML. In FIG. 5, reference character D denotes an effective diameter (a value slightly smaller than the array pitch P of the microlens ML) of the microlens ML, and reference character Pd denotes a pixel pitch of the pixel array 130. As illustrated in FIG. 5, the region E0 with the width P at the front end of the synthesis range L is projected on the pixel c located in the rear of the microlens ML with the power of the microlens ML.

In FIG. 5, the spread of the bundles of rays denoted by reference character Fd corresponds to the spread of the bundles of rays transmitted through the sub-region C of the pupil of the photographic lens 11. Hence, the value of the spread Fd of the bundles of rays is determined in correspondence with a value of a maximum aperture F-number (F0) of the photographic lens 11 and the number of divisions of the pupil in one direction (the number of sub-regions of the pupil in one direction). For example, when the following conditions are assumed, the maximum aperture F-number F0 of the photographic lens 11=4, and the number of pixels n in one direction of the pixel array 130=5, the following can be established, the number of divisions in one direction of the pupil=n=5, therefore, the following is determined, the spread Fd of bundles of rays=F0×n=4×5=20.

(Note that the unit of the spread of the bundles of rays corresponds to that of the F-number.)

Next, the difference between the case of this embodiment and a case where the exit pupil of the photographic lens is substantially conjugate with the pixel of the image sensor with respect to the microlens as described in Non-Patent Document 1 is described. In this embodiment, the position located at the distance L from the front side of the microlens ML is substantially conjugate with the pixel of the image sensor 13 with respect to the microlens ML.

Figure 21:
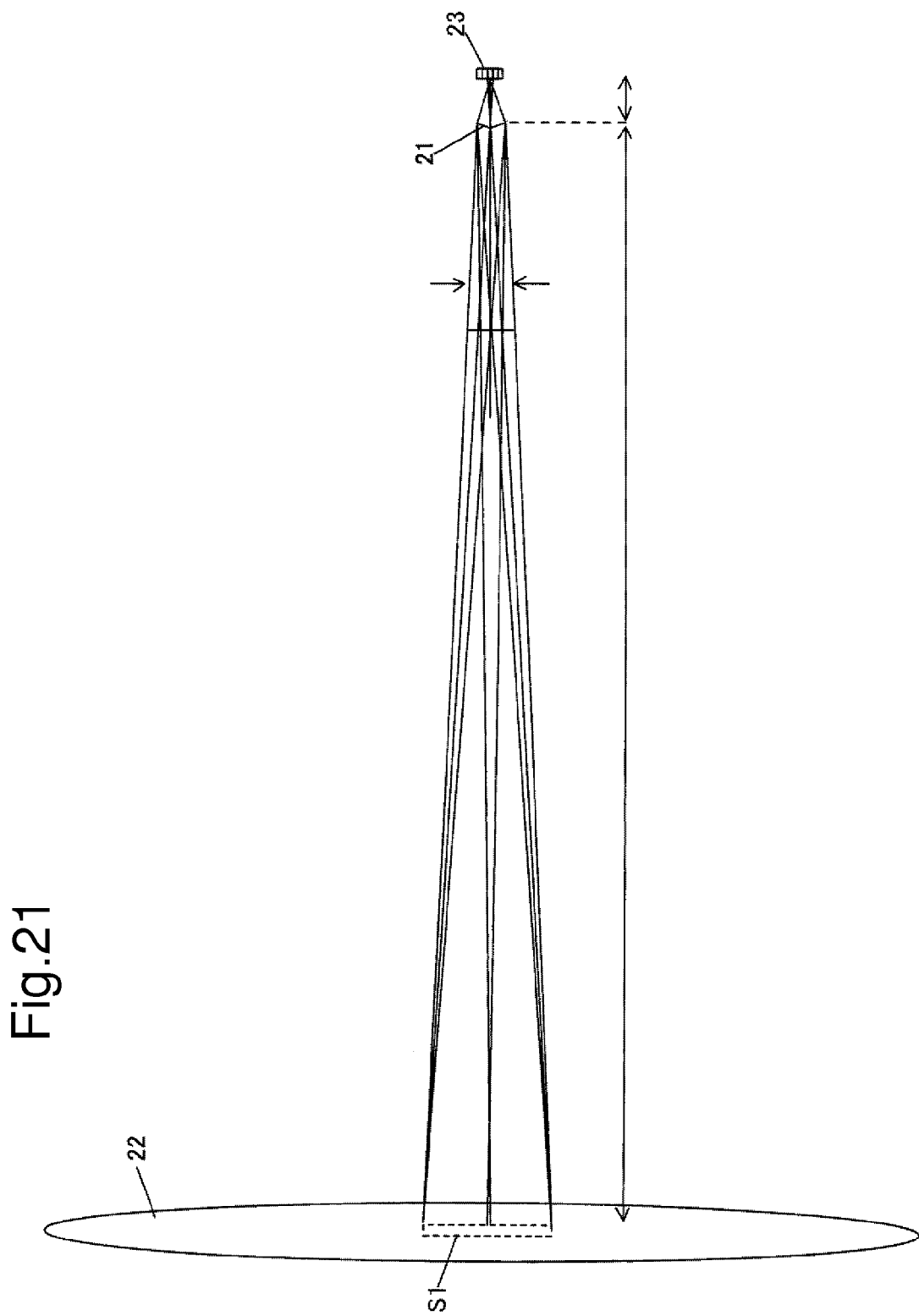
FIG. 21 is an illustration explaining a case where an exit pupil of a photographic lens is substantially conjugate with an image sensor with respect to a microlens.

FIG. 21 is an illustration explaining the case where an exit pupil of a photographic lens 22 is substantially conjugate with an image sensor 23 with respect to a microlens 21. In this case, bundles of rays transmitted through a sub-pupil S1 of the exit pupil of the photographic lens 22 are incident on one pixel of the image sensor 23 in a geometrical-optical sense.

Considering the actual size, the pitch of the microlens is about 200 μm or smaller (for example, the pitch of the microlens ML of this embodiment is 15 μm). On the other hand, the width of the sub-pupil S1 of the exit pupil of the photographic lens 22 is about 1 mm or larger. In such a case, as shown in FIG. 21, the spread of the bundles of rays becomes wide toward the exit pupil of the photographic lens 22, and becomes narrow toward the microlens 21. That is, the cross-sectional diameter of the bundles of rays in any cross section between the photographic lens 22 and the microlens 21 is larger than the diameter of the microlens 21.

Since the bundles of rays provide information of one pixel for a synthetic image, in order to form a sharp synthetic image, it is desirable for the bundles of rays to be narrower in the region for the image synthesis. Therefore, in this embodiment, as shown in FIGS. 4 and 5 mentioned above, the cross-sectional diameter of the bundles of rays is substantially equal to or smaller than the pitch P of the microlens ML at the position located at the distance L in the vicinity of the microlens ML for the image synthesis, so as to increase the sharpness of the synthetic image. In this embodiment, the sub-pupils may become slight blur and overlap each other.

Next, a way of determining the power of the microlens ML in this embodiment will be described. For simplification, assume that the microlens ML is a thin-plate lens, and the refractive index at both edges of the microlens ML is 1. As shown in FIG. 5, the following Expression (i) can be established, where g is a gap between the microlens ML and a pixel of the pixel array 130 of the image sensor 13, Pd is a pitch of the pixel, and E is a pitch of a geometric-optical pixel image provided by the microlens ML in a plane at the position located at the distance L. The gap g also represents a gap between the microlens array 12 and the image sensor 13. If the thickness of the microlens ML is ignored for simplification, then the following expression can be established:

$$L/g=E/Pd \quad \text{(i)}$$

When the pitch of the microlens ML is P, the external diameter of the bundles of rays in the vicinity of the microlens ML is allowed to be substantially uniform within a predetermined range, which means E=P, and hence, Expression (ii) can be established as follows:

$$L=g*P/Pd \quad \text{(ii)}$$

Since g is determined from the number of sub-regions arranged at the exit pupil of the photographic lens 11 corresponding to the number of pixels of the pixel array 130 of the image sensor 13, the distance L may be determined by this expression. For the focal length fm of the microlens, using the relationship of the following Expression (iii), the focal length fm of the microlens is determined, i.e., the power of the microlens is determined.

$$1/L+1/g=1/fm \quad \text{(iii)}$$

While only the geometric spread of the bundles of rays is concerned in the above description, actually, there may be also a spread of bundles of rays due to diffraction. The spread due to the diffraction is discussed below.

Figure 6:
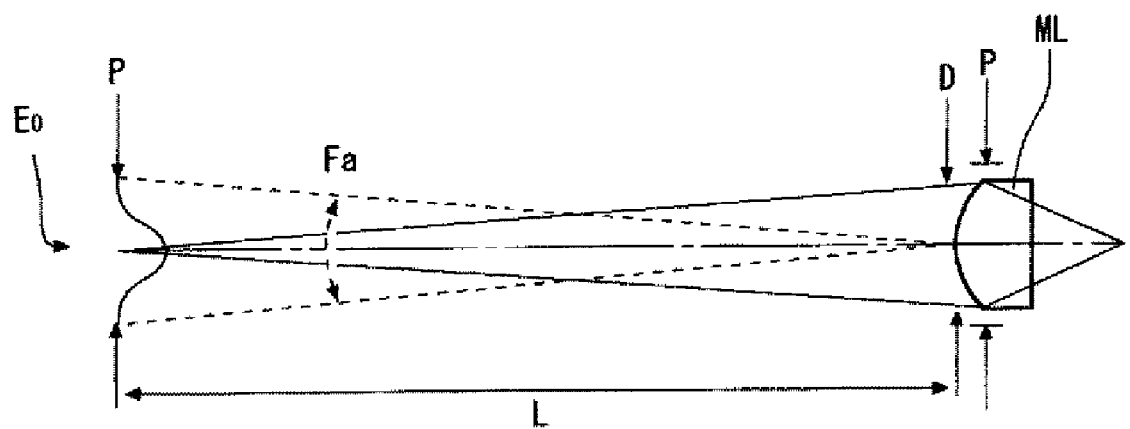
FIG. 6 is an illustration explaining a spread of the bundles of rays incident on the pixel c because of diffraction.

FIG. 6 is an enlarged illustration showing the spread due to diffraction of the bundles of rays incident on the pixel c through the microlens ML. As illustrated by a curved line in FIG. 6, light supposedly emitted from a point on the pixel c may have a spread due to diffraction, as illustrated, at the position located at the distance L. Namely, a region having the illustrated spread at the position of L represents a spread due to diffraction causing blur.

Figure 7:
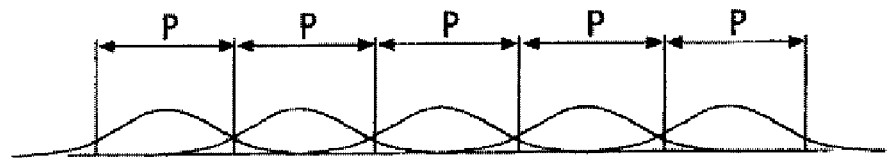
FIG. 7 is a conceptual diagram showing an appearance of blur at edges of a region E0 to be projected on the pixel c.

Therefore, as shown in FIG. 7, edges of the region E0 projected on the pixel c does not become sharp, but may be blurred. In a similar manner, the boundaries of the sub-regions A, B, C, D and E of the pupil of the photographic lens 11 may be also blurred. To allow the boundaries to be sharp to a certain degree, it is important to somewhat reduce the spread of the bundles of rays due to diffraction. The details thereof are described below.

First, a spread (blur) A of the bundles of rays due to diffraction becomes more noticeable as the effective diameter D of the microlens ML becomes small. For example, when assuming that the wavelength of light is about 0.5 μm, the spread A is expressed using Expression (1) as follows:

$$A \approx L/D \quad (1)$$

When assuming that Fa is the spread A of the bundles of rays due to diffraction with the units of F-number, Fa is expressed using Expression (2) as follows:

$$Fa \approx L/A \approx D \quad (2)$$

With Expressions (1) and (2), the spread Fa of the bundles of rays due to diffraction is determined mainly by the effective diameter D of the microlens ML.

$$Fa \approx D \quad (3)$$

To allow the above-mentioned boundaries to be sharp, the spread Fa of the bundles of rays due to diffraction may be preferably sufficiently small as compared with the maximum aperture F-number F0 (e.g., F0=4) of the photographic lens 11, for example, 2/5 or smaller. That is, the spread Fa preferably satisfies Expression (4) as follows:

$$Fa>10 \tag{4}$$

Therefore, the effective diameter D of the microlens ML preferably satisfies Expression (5) as follows:

$$D>10\ \mu m \tag{5}$$

To allow the above-mentioned boundaries to be further sharp, the effective diameter D of the microlens ML preferably satisfies Expression (6) as follows:

$$D>20\ \mu m \tag{6}$$

Figure 8:
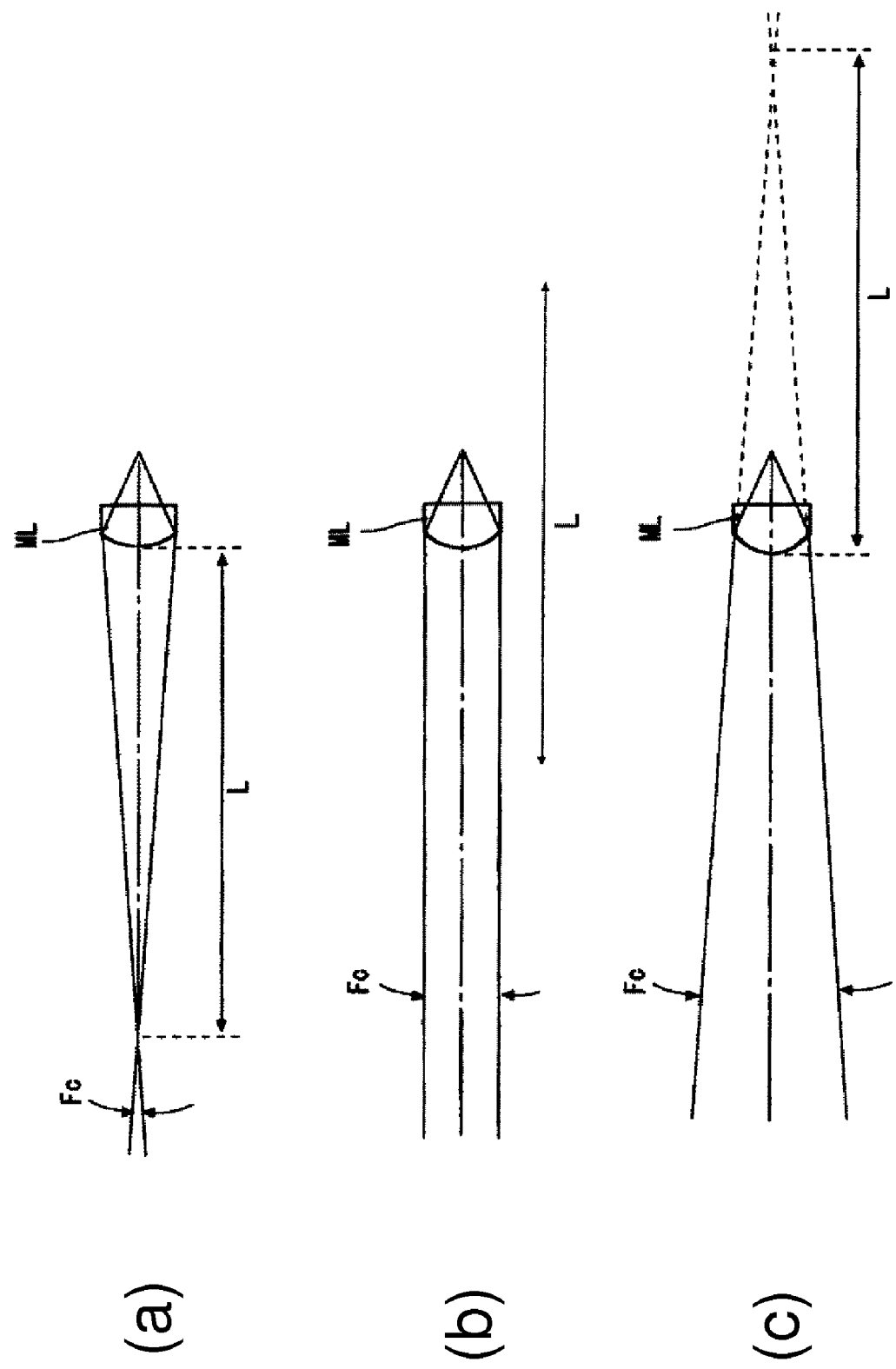
FIG. 8 is an illustration showing a variety of positions of a conjugate plane of the pixel c with respect to a microlens ML.

Example specifications of the image-capturing apparatus concerning the above-described conditions (conditions related to the microlens ML) are listed below:

the focal length f of the photographic lens 11=9 mm,
the maximum aperture F-number F0 of the photographic lens 11=4,
the number of pixels n in one direction of the pixel array 130=5
the array pitch P of the microlens ML=15 μm,
the effective diameter D of the microlens ML=the array pitch P≈15 μm,
the size of the microlens array 12=8.8×6.6 mm,
the number of arrayed microlenses ML=586×440,
the synthesis range L=n×F=300 μm, and
the synthesis range converted into the photographic distance=optical infinity ~270 mm In the above description, as shown in FIG. 8(a), while the conjugate plane of the pixel c is arranged at a finite position (the position located at the distance L) in the front of the microlens ML, the conjugate plane may be arranged at optical infinity in the front of the microlenses ML as shown in FIG. 8(b), or may be arranged in the rear of the microlens ML as shown in FIG. 8(c).

In the case of FIG. 8(a), while the synthesis range L is a limited range in the front of the microlens ML, the synthesis range L may be a limited range extending over both sides of the microlens ML in the case of FIG. 8(b), or may be a limited range in the rear of the microlens ML in the case of FIG. 8(c). Hereinafter, the description is based on the case where the synthesis range L is the limited range in the front of the microlens ML (FIG. 8(a)).

Figure 9:
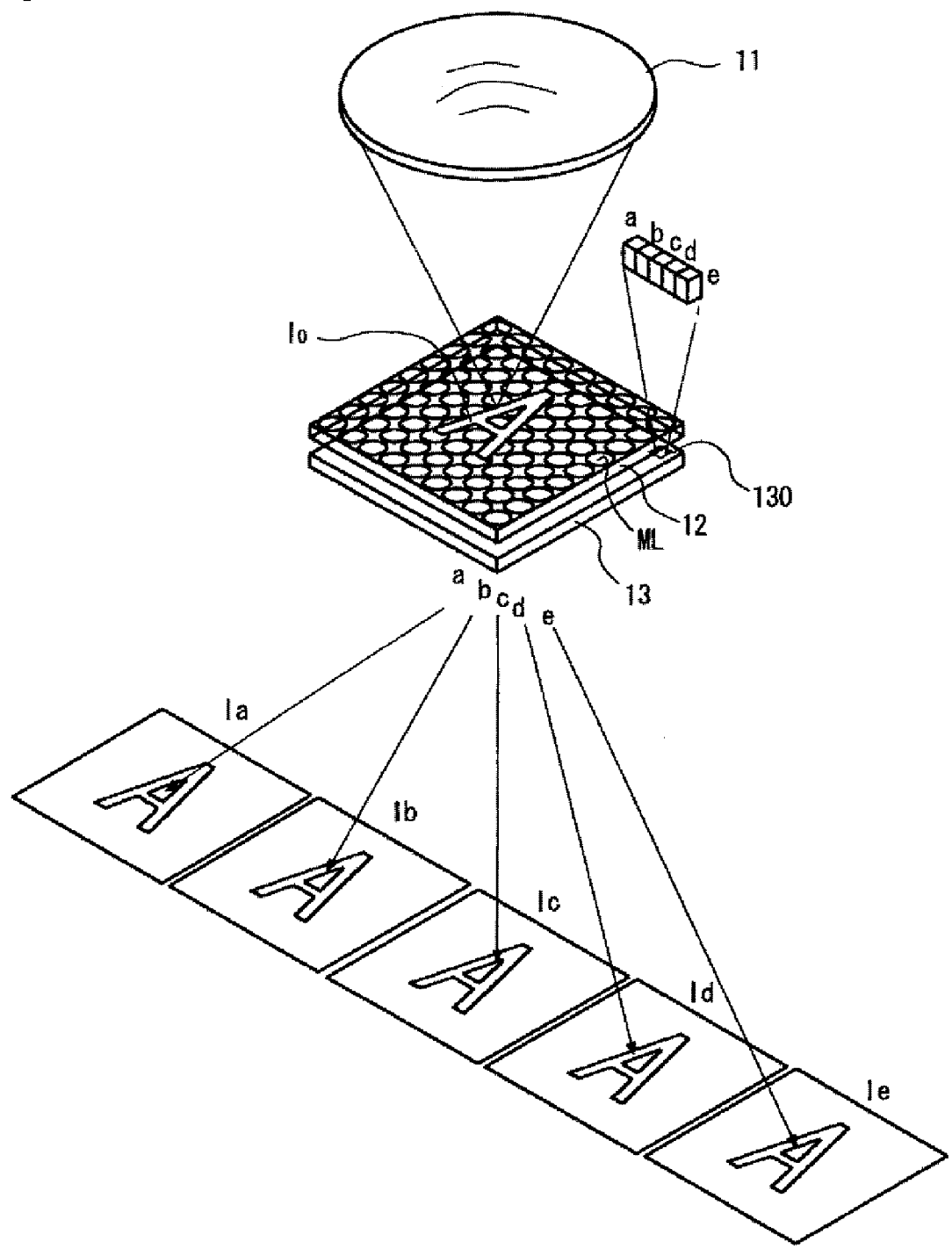
FIG. 9 is an illustration explaining the fundamental of image synthesis (in a case of z=0).
Figure 10:
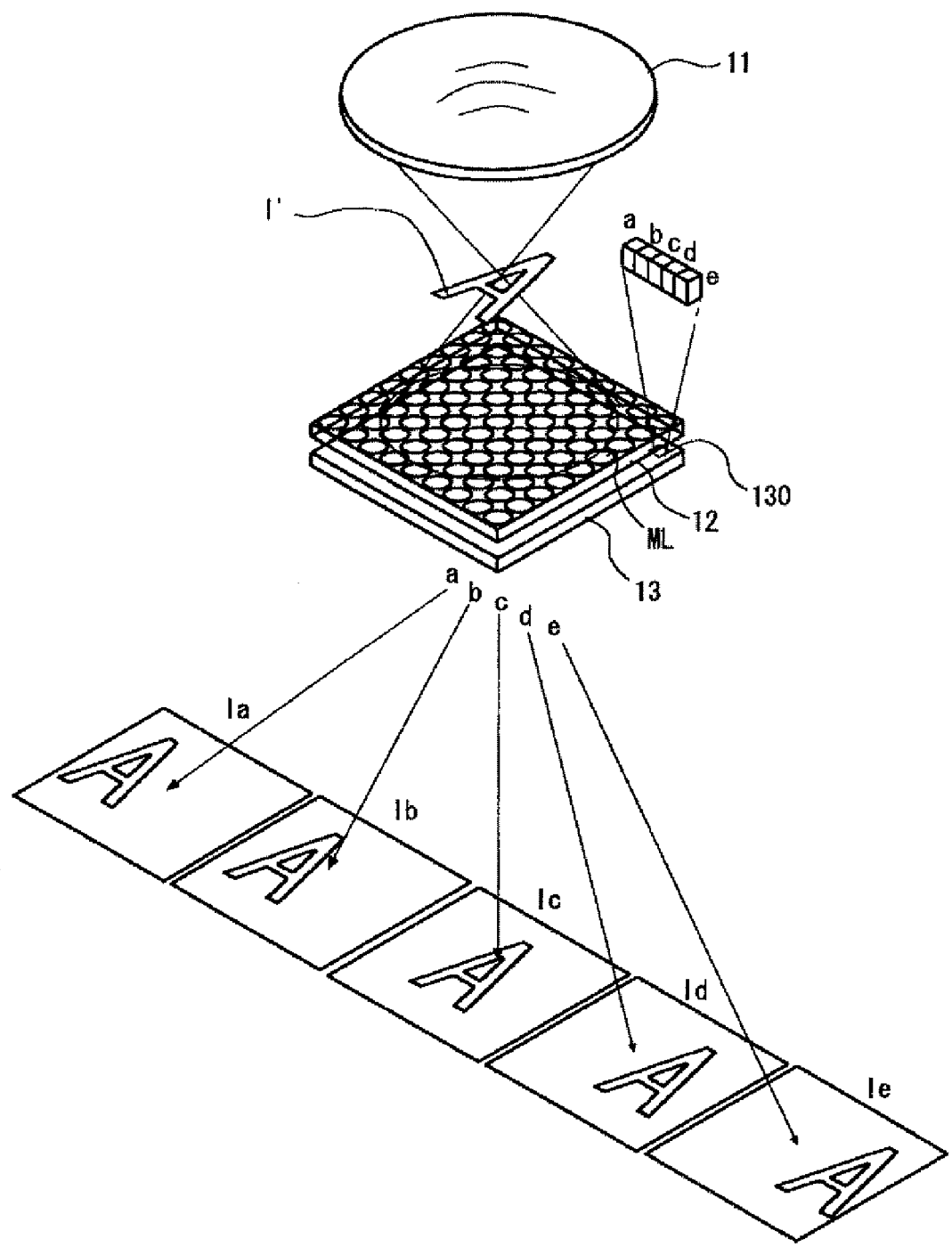
FIG. 10 is an illustration explaining the fundamental of image synthesis (in a case of z≠0).

Next, an image synthesis method will be described. Processing required for the synthesis is executed by the arithmetic processing circuit 15 (see FIG. 1). FIGS. 9 and 10 are illustrations explaining the fundamentals of image synthesis. In FIGS. 9 and 10, reference characters Ia, Ib, Ic, Id, and Ie conceptually denote sets of image data each of which is formed by combining each of the five pixels a, b, c, d, and e arrayed in one direction in the pixel array 130 corresponding to each microlens.

A case is considered where a height z of the designated image plane (a distance from the microlens array 12) is zero as shown in FIG. 9. In case that a focused image is formed at a plane of Z=0, since bundles of rays emitted from a portion directly above a microlens immediately enter the microlens array 12, bundles of rays emitted from a single portion of an image $I_0$ are incident on the pixels a, b, c, d, and e in the single pixel array 130.

At this time, the image $I_0$ appears at the same position of each of the image data Ia, Ib, Ic, Id, and Ie. Therefore, by superposing the image data Ia, Ib, Ic, Id, and Ie, image data of the designated image plane (Z=0) can be obtained.

While the five pixels a, b, c, d, and e arrayed in one direction are selected and the five sets of image data Ia, Ib, Ic, Id, and Ie based on the five pixels are superposed, actually, twenty-five sets of image data based on twenty-five pixels arrayed in either direction are required to be superposed.

Next, a case is shown where a height z of the designated image plane is not zero as shown in FIG. 10. The bundles of rays emitted from a position of an image I' formed in this plane are diverged and then enter the microlens array 12, and hence, bundles of rays emitted from the position in the image I' at various angles enter the different microlenses ML in accordance with the angles. Accordingly, the pixels a, b, c, d, and e in the pixel array 130 corresponding to the single microlens ML receive bundles of rays from slightly different positions in the image I'.

At this time, the image I' appears at shifted positions of the image data Ia, Ib, Ic, Id, and Ie. The shift amount depends on the height Z of the designated image plane. Due to this, the sizes of the image data Ia, Ib, Ic, Id, and Ie are converted into an image size according to the height z, shifted by a pitch of the microlens, and superposed, thereby obtaining image data of the designated image plane (Z≠0).

While the five pixels a, b, c, d, and e arrayed in one direction are selected and the five sets of image data Ia, Ib, Ic, Id, and Ie based on the five pixels are superposed, actually, twenty-five sets of image data based on twenty-five pixels arrayed in either direction are required to be superposed.

In this embodiment, therefore, the sizes of the twenty-five sets of image data based on the twenty-five pixels are converted into an image size by an amount corresponding to the height Z of the designated image plane, then the images are inverted vertically and horizontally, the images related to the adjacent microlenses are shifted by a predetermined amount and are superposed, and pixels at the same position or pixel interpolation values are weighted and added for synthesis, thereby obtaining the entire image of the designated image plane.

Figure 11:
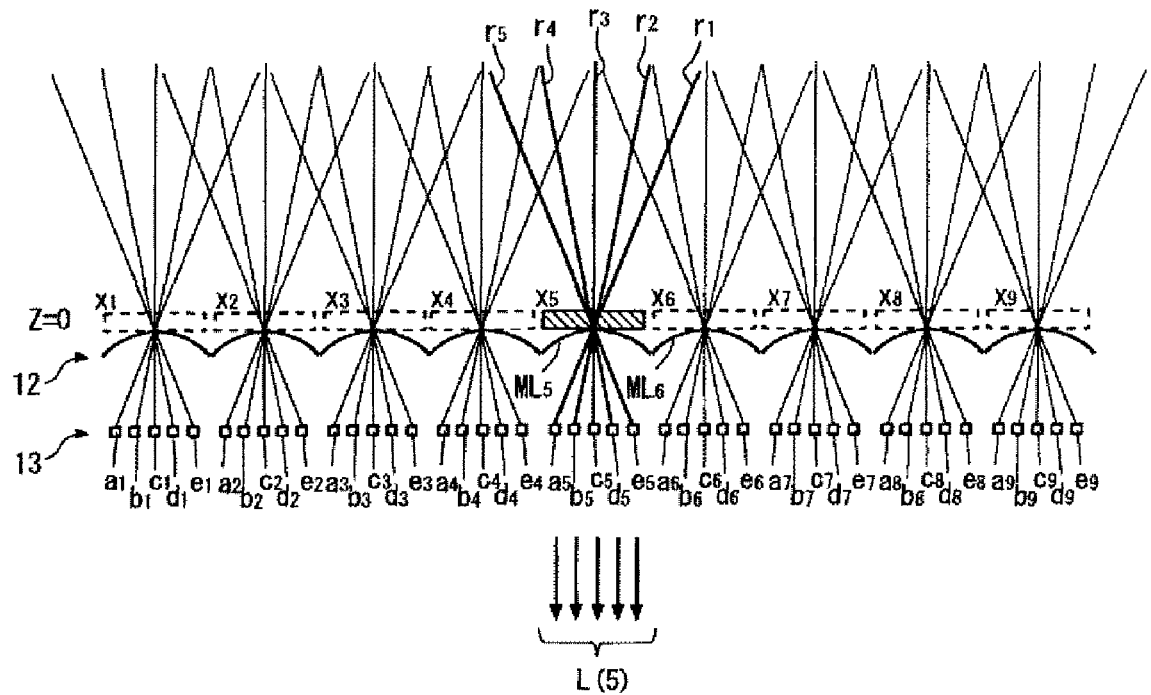
FIG. 11 is an illustration explaining a synthesis method when a designated image plane is a predetermined plane (Z=0) within a synthesis range.

Next, the image synthesis method will be described in more specifically. FIG. 11 is an illustration explaining a synthesis method when the designated image plane is a predetermined plane (Z=0) within the synthesis range, FIG. 12 is an illustration explaining a synthesis method when the designated image plane is a predetermined plane (Z=$h_1$) within the synthesis range, and FIG. 13 is an illustration explaining a synthesis method when a designated image plane is a plane (Z=$h_2$) different from the above planes, within the synthesis range.

Figure 12:
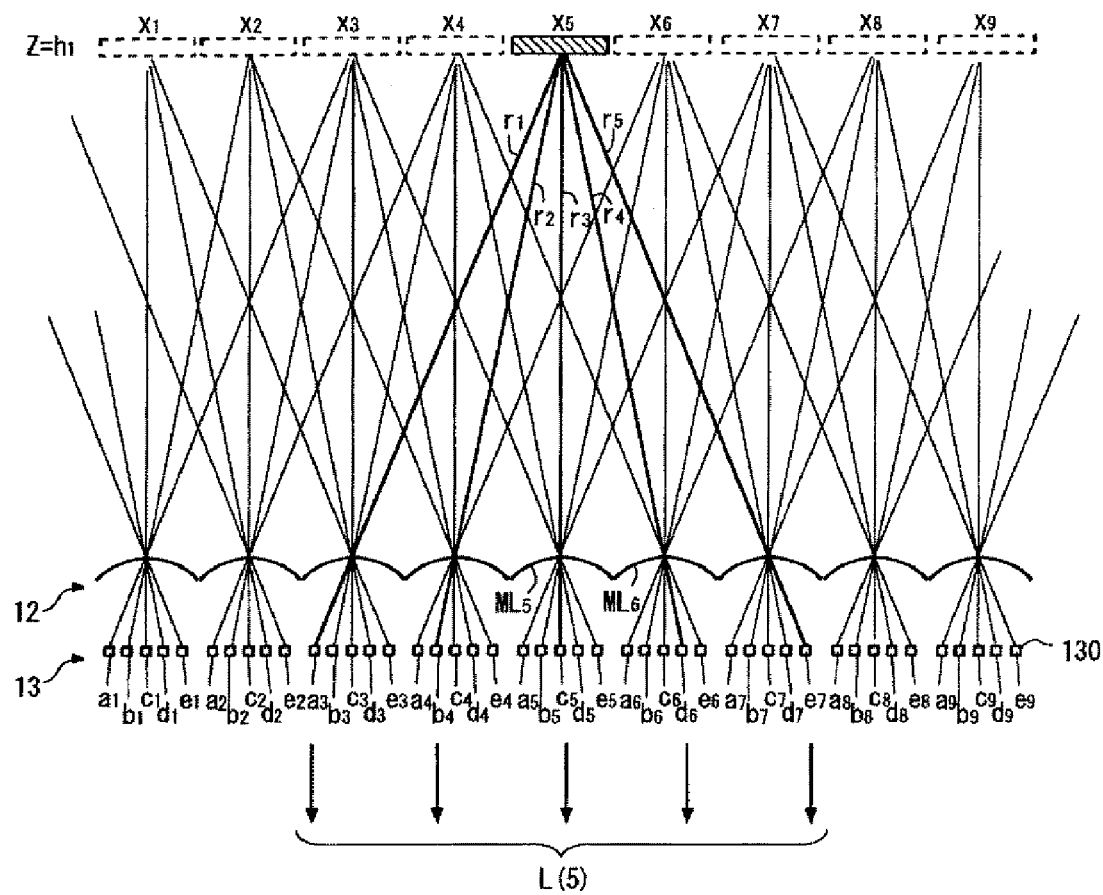
FIG. 12 is an illustration showing a synthesis method when the designated image plane is a predetermined plane (Z=$h_1$) within the synthesis range.
Figure 13:
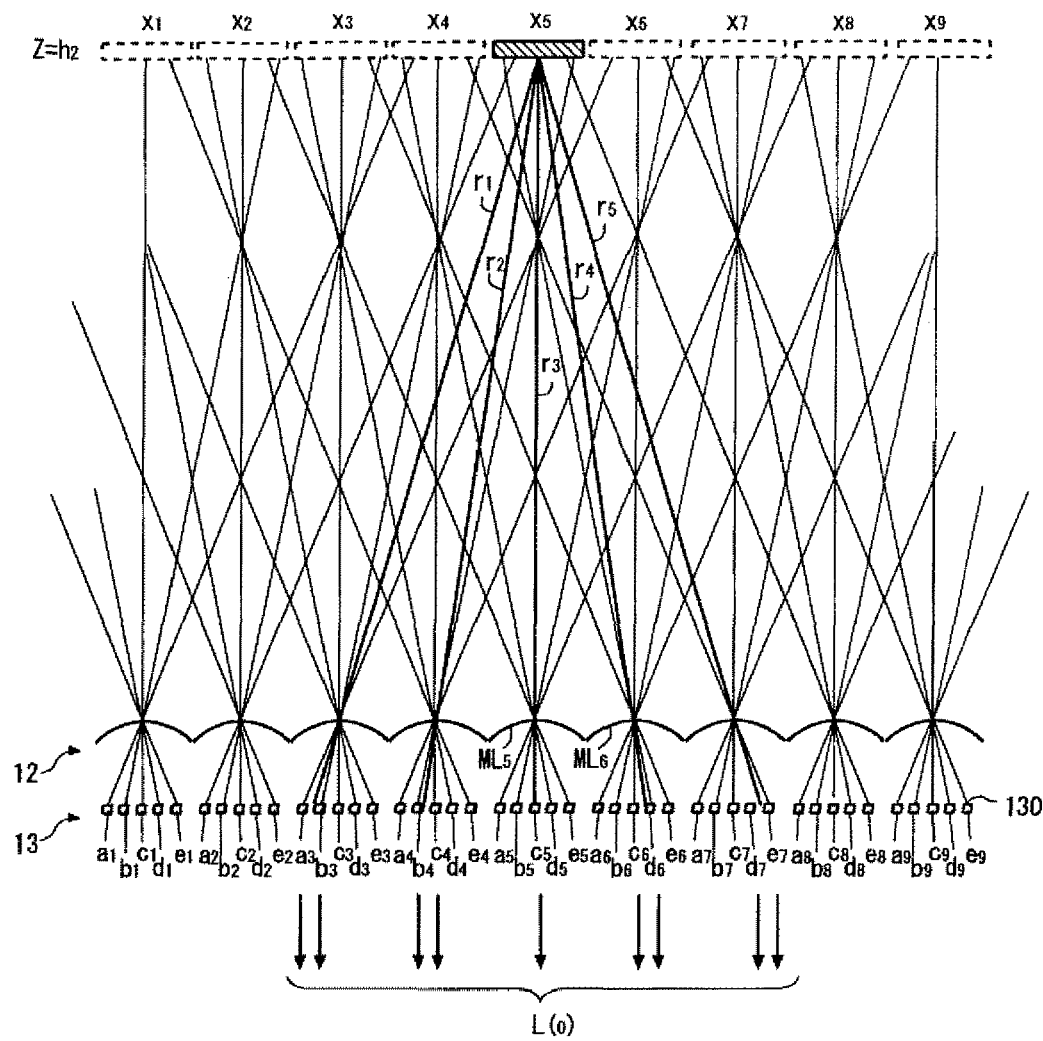
FIG. 13 is an illustration showing a synthesis method when the designated image plane is a general plane (Z=$h_2$) within the synthesis range.

In FIGS. 11 to 13, rays (only chief rays passing through the centers of the microlenses ML) incident on the five pixels a, b, c, d, and e of the image sensor 13 are illustrated. Also, elements in the drawings are provided with subscripts (1, 2, 3, ... ) for showing coordinates in a plane orthogonal to the optical axis. Indicated by dotted lines in FIGS. 11 to 13 are minimum units (virtual pixels) of image data after synthesis, and the width of each virtual pixel is similar to the array pitch P of the microlens ML.

As shown in FIG. 11, first, a case is shown where the designated image plane is the predetermined plane (Z=0) within the synthesis range. The bundles of rays (rays $r_1, r_2, r_3, r_4,$ and $r_5$) emitted from a coordinate $x_5$ (a region with the width P opposite to a microlens $ML_5$) in this plane are respectively incident on pixels $a_5, b_5, c_5, d_5,$ and $e_5$. Therefore, by adding an output value Out ($a_5$) of the pixel $a_5$, an output value Out ($b_5$) of the pixel $b_5$, an output value Out ($c_5$) of the pixel $c_5$, an output value Out ($d_5$) of the pixel $d_5$, and an output value Out($e_5$) of the pixel $e_5$, a pixel value L(5) of the virtual pixel at the coordinate $x_5$ is obtained (Expression (1)).

$$L(5)=\text{Out}(a_5)+\text{Out}(b_5)+\text{Out}(c_5)+\text{Out}(d_5)+\text{Out}(e_5) \tag{1}$$

In a similar manner, a pixel value L(6) of the virtual pixel at the coordinate $x_6$ adjacent to the coordinate $x_5$ is obtained using Expression (1').

$$L(6)=\text{Out}(a_6)+\text{Out}(b_6)+\text{Out}(c_6)+\text{Out}(d_6)+\text{Out}(e_6) \tag{1'}$$

Therefore, pixel values $L(1)$, $L(2)$, $L(3)$, ..., of virtual pixels at coordinates $x_1$, $x_2$, $x_3$, ..., are obtained using Expression (1'').

$$L(i)=\text{Out}(a_i)+\text{Out}(b_i)+\text{Out}(c_i)+\text{Out}(d_i)+\text{Out}(e_i) \quad (1'')$$

Expression (1'') means that the image data Ia, Ib, Ic, Id, and Ie shown in FIG. 9 are directly superposed. By using Expression (1''), the synthetic image data of the designated image plane (Z=0) is formed.

Expression (1'') is employed when the designated aperture value by the user is minimum (maximum aperture size) If the designated aperture value by the user is maximum (minimum aperture size), the bundles of rays composed of the rays $r_1$, $r_2$, $r_3$, $r_4$, and $r_5$ are limited to bundles of rays composed of the ray $r_3$. Thus, Expression (2) may be employed instead of Expression (1'').

$$L(i)=\text{Out}(c_i) \quad (2)$$

Also, if the designated aperture value by the user is a medium value (medium aperture size), the bundles of rays composed of the rays $r_1$, $r_2$, $r_3$, $r_4$, and $r_5$ are limited to bundles of rays composed of the rays $r_2$, $r_3$, and $r_4$. Thus, Expression (3) may be employed instead of Expression (1'').

$$L(i)=\text{Out}(b_i)+\text{Out}(c_i)+\text{Out}(d_i) \quad (3)$$

While the five pixels a, b, c, d, and e arrayed in one direction are selected and the output values of the five pixels are added, actually, output values of twenty-five pixels arrayed in two directions are required to be added (the number of pixels added to the sum, however, is increased or decreased in accordance with the designated aperture value).

As shown in FIG. 12, next, a case is shown where the designated image plane is the predetermined plane (Z=$h_1$) different from the above-mentioned plane, within the synthesis range. The bundles of rays (rays $r_1$, $r_2$, $r_3$, $r_4$, and $r_5$) emitted from the coordinate $x_5$ (the region opposite to the microlens $ML_5$) in this plane are incident on pixels $a_3$, $b_4$, $c_5$, $d_6$, and $e_7$. Therefore, by adding an output value Out($a_3$) of the pixel $a_3$, an output value Out($b_4$) of the pixel $b_4$, an output value Out($c_5$) of the pixel $c_5$, an output value Out($d_6$) of the pixel $d_6$, and an output value Out($e_7$) of the pixel $e_7$, (to be more correct, by getting a weighted sum depending on the angle of incidence), a pixel value L(5) of the virtual pixel at the coordinate $x_5$ is obtained (Expression (4)).

$$L(5)=\text{Out}(a_3)+\text{Out}(b_4)+\text{Out}(c_5)+\text{Out}(d_6)+\text{Out}(e_7) \quad (4)$$

In a similar manner, a pixel value L(6) of the virtual pixel at the coordinate $x_6$ adjacent to the coordinate $x_5$ is obtained using Expression (4').

$$L(6)=\text{Out}(a_4)+\text{Out}(b_5)+\text{Out}(c_6)+\text{Out}(d_7)+\text{Out}(e_8) \quad (4')$$

Therefore, pixel values L(1), L(2), L(3), ..., of virtual pixels at coordinates $x_1$, $x_2$, $x_3$, ..., are obtained using Expression (4'').

$$L(i)=\text{Out}(a_{i-2})+\text{Out}(b_{i-1})+\text{Out}(c_i)+\text{Out}(d_{i-1})+\text{Out}(e_{i+2}) \quad (4'')$$

Expression (4'') means that the image data Ia, Ib, Ic, Id, and Ie shown in FIG. 10 are shifted by an amount corresponding to the height Z of the designated image plane (in this case, by an amount corresponding to one virtual pixel), and then superposed. Accordingly, the synthetic image data of the designated image plane (Z=$h_1$) is formed.

Expression (4'') is employed when the designated aperture value by the user is minimum (maximum aperture size). If the designated aperture value by the user is maximum (minimum aperture size), the bundles of rays composed of the rays $r_1$, $r_2$, $r_3$, $r_4$, and $r_5$ may be limited to bundles of rays composed of the ray $r_3$. Thus, Expression (5) may be employed instead of Expression (4'').

$$L(i)=\text{Out}(c_i) \quad (5)$$

Also, if the designated aperture value by the user is a medium value (medium aperture size), the bundles of rays composed of the rays $r_1$, $r_2$, $r_3$, $r_4$, and $r_5$ are limited to bundles of rays composed of the rays $r_2$, $r_3$, and $r_4$. Thus, Expression (6) may be employed instead of Expression (4'').

$$L(i)=\text{Out}(b_{i-1})+\text{Out}(c_i)+\text{Out}(d_{i+1}) \quad (6)$$

While the five pixels a, b, c, d, and e arrayed in one direction are selected and the output values of the five pixels are added, actually, output values of twenty-five pixels arrayed in two directions are required to be added (the number of pixels added to the sum, however, is increased or decreased in accordance with the value of the designated aperture value).

As shown in FIG. 13, next, a case is shown where the designated image plane is a plane (Z=$h_2$) different from the above-mentioned planes within the synthesis range. The bundles of rays (rays $r_1$, $r_2$, $r_3$, $r_4$, and $r_5$) emitted from the coordinate $x_5$ (the region opposite to the microlens $ML_5$) in this plane are incident across a plurality of pixels. For example, the ray $r_1$ is incident across the pixels $a_3$ and $b_3$. At this time, a light amount of the ray $r_1$ is obtained on the basis of the weighted sum of an output value Out ($a_3$) of the pixel $a_3$ and an output value Out ($b_3$) of the pixel $b_3$ (Expression (7)).

$$\text{Out}(a_3)\times q_1+\text{Out}(b_3)\times q_2 \quad (7)$$

The sum of weighting coefficients $q_1$ and $q_2$ is a constant determined depending on the height Z of the designated image plane. Therefore, the pixel values L(1), L(2), L(3), of the virtual pixels at the coordinates $x_1$, $x_2$, $x_3$, ..., have to be obtained in accordance with the weighted sum of the plurality of output values, in particular, the weighted sum using the weighting coefficients determined depending on the height Z of the designated image plane (the number of pixels added to the sum, however, is increased or decreased in accordance with the value of the designated aperture value).

As described above, in the image-capturing apparatus, in the synthesis of the image data of the designated image plane, the image synthesis can be performed by using the weighted sum of the plurality of output values even when the designated image plane is not the predetermined plane. Also, in the case where the designated image plane is the predetermined plane (Z=0, Z=$h_1$) shown in FIGS. 11 and 12, the synthesis can be performed with further high accuracy, by using the rays in addition to the chief rays, and using the weighted sum of all output values related to the rays.

Figure 14:
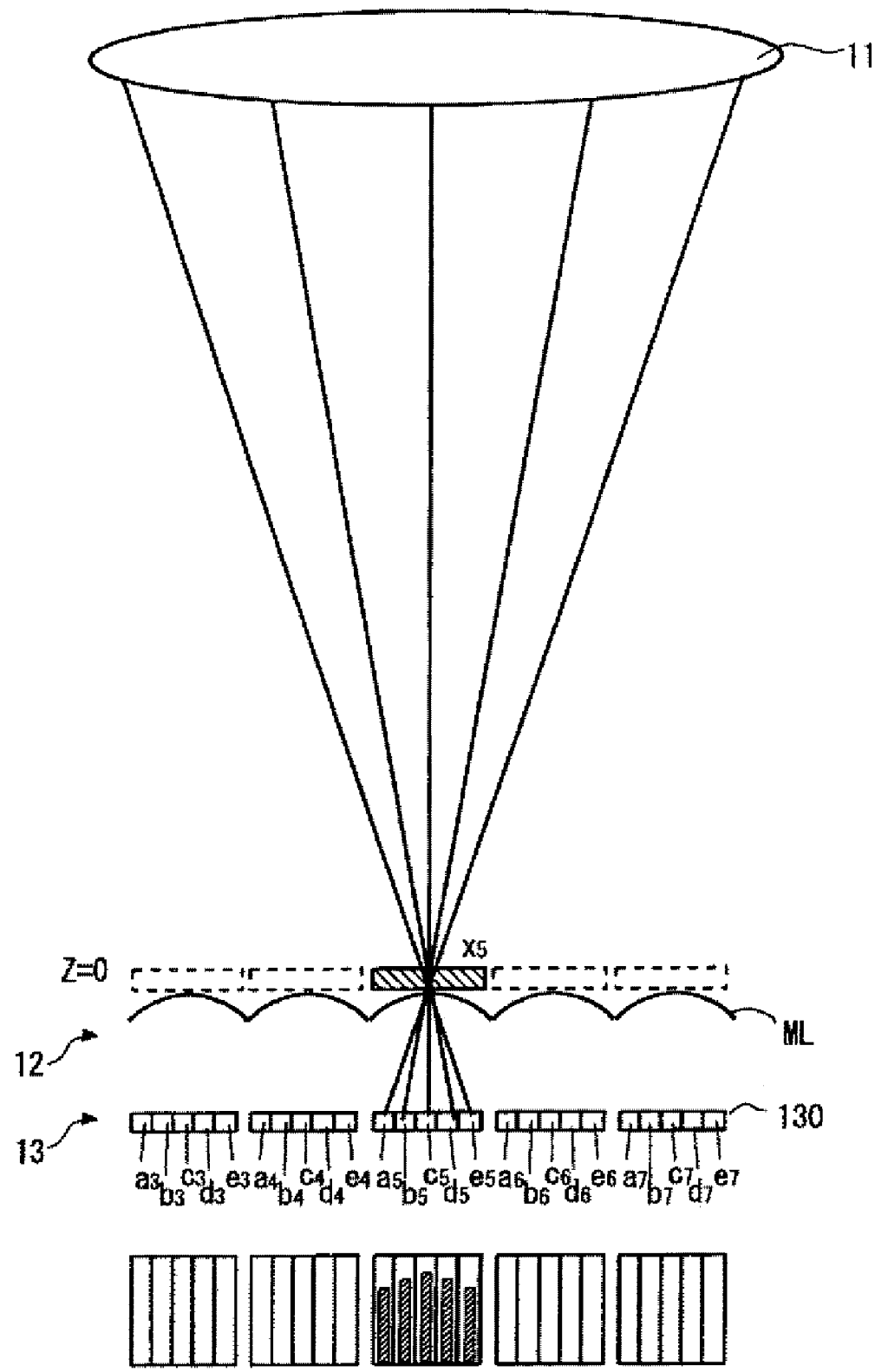
FIG. 14 is an illustration showing an example of a weighting coefficient when the designated image plane is the predetermined plane (Z=0) within the synthesis range.
Figure 15:
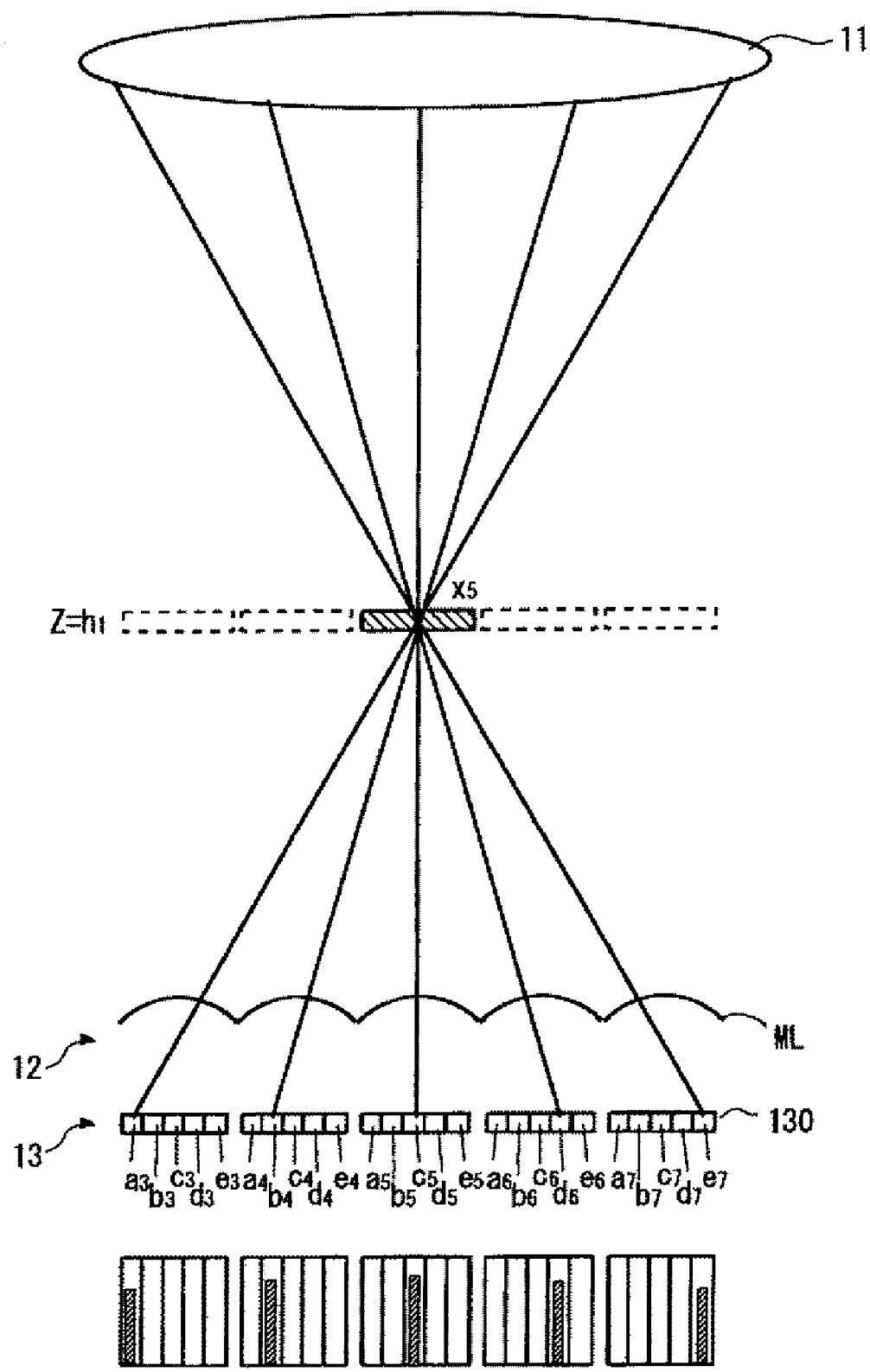
FIG. 15 is an illustration explaining an example of a weighting coefficient when the designated image plane is the another predetermined plane (Z=$h_1$) within the synthesis range.
Figure 16:
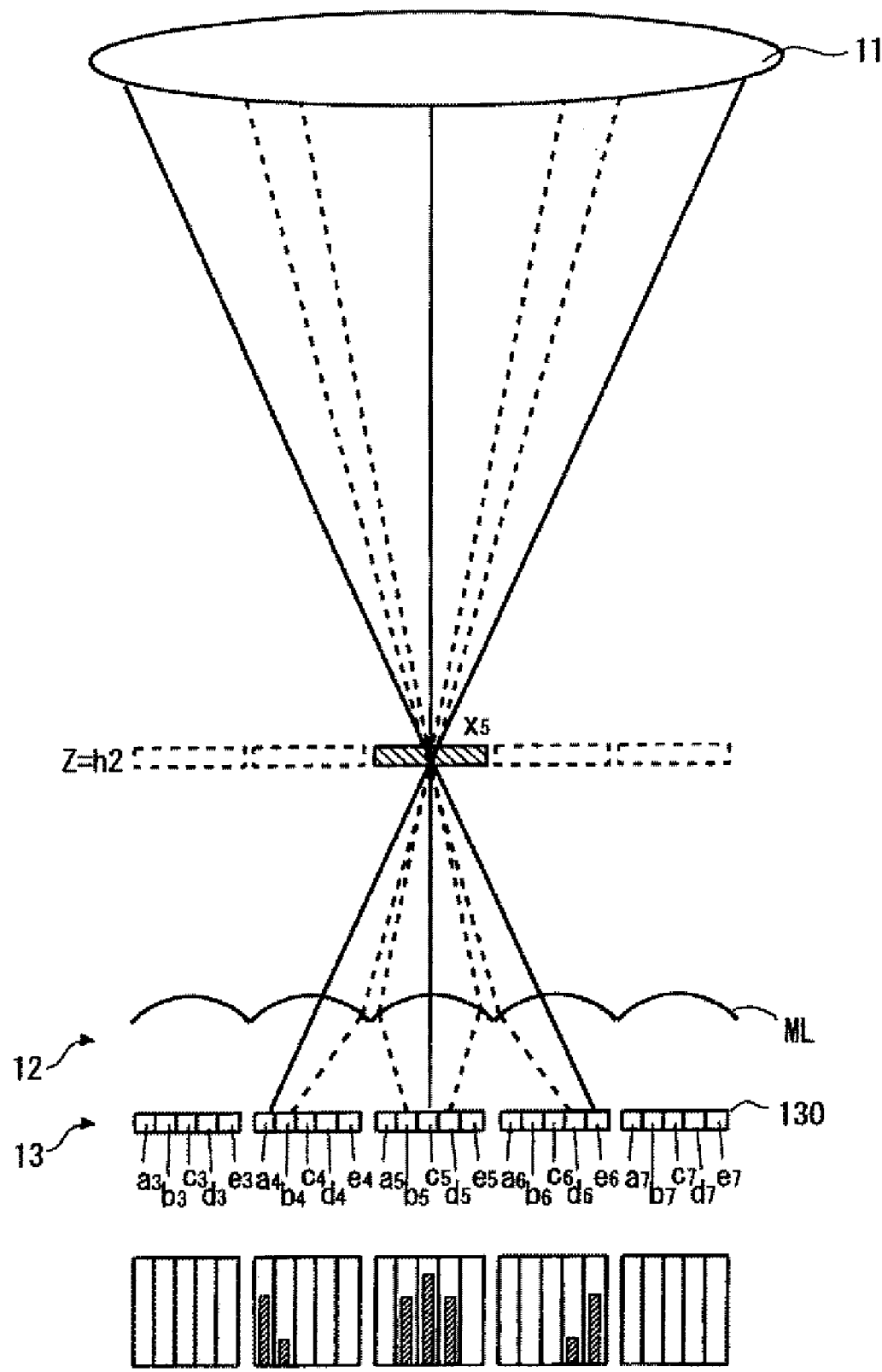
FIG. 16 is an illustration explaining an example of a weighting coefficient when the designated image plane is the general plane (Z=$h_2$) within the synthesis range.

Next, a specific example of the weighting coefficient will be described. FIGS. 14 to 16 show examples of the weighting coefficient for obtaining the pixel value L(5) of the virtual pixel located at the coordinate $x_5$. A case is described herein where the designated aperture value by the user is minimum. For simplification, the five pixels a, b, c, d, and e arrayed in one direction are selected.

FIG. 14 illustrates a case where the designated image plane is the predetermined plane (z=0) within the synthesis range, FIG. 15 illustrates a case where the designated image plane is the another predetermined plane (Z=$h_1$) within the synthesis range, and FIG. 16 illustrates a case where the designated image plane is the general plane (z=$h_2$) within the synthesis range. In FIGS. 14 to 16, a length of a bar corresponding to each pixel represents a value (a relative value) of a weighting coefficient applied to the output value of each pixel. An optimum weighting value may be experimentally obtained.

To collectively obtain image data of the designated image plane in a manner of the example shown in FIG. 14, the following arithmetic expression may be used.

$$\begin{pmatrix} \vdots \\ L(0) \\ L(1) \\ L(2) \\ \vdots \end{pmatrix} = \begin{pmatrix} \cdots & 00000 & 00000 & 00000 & 00000 & 00000 & \cdots \\ \cdots & w1w2w3w4w5 & 00000 & 00000 & 00000 & 00000 & \cdots \\ \cdots & 00000 & w1w2w3w4w5 & 00000 & 00000 & 00000 & \cdots \\ \cdots & 00000 & 00000 & w1w2w3w4w5 & 00000 & 00000 & \cdots \\ \cdots & 00000 & 00000 & 00000 & w1w2w3w4w5 & 00000 & \cdots \end{pmatrix} \begin{pmatrix} \vdots \\ a1 \\ b1 \\ c1 \\ d1 \\ e1 \\ a2 \\ b2 \\ c2 \\ d2 \\ e2 \\ a3 \\ b3 \\ c3 \\ d3 \\ e3 \\ \vdots \end{pmatrix}$$

[Expression 1]

Or, to collectively obtain image data of the designated image plane in a manner of the example shown in FIG. 15, the following arithmetic expression may be used.

$$\begin{pmatrix} \vdots \\ L(0) \\ L(1) \\ L(2) \\ \vdots \end{pmatrix} = \begin{pmatrix} \cdots & w10000 & 0w2000 & 00w300 & 000w40 & 0000w5 & \cdots \\ \cdots & 00000 & w10000 & 0w2000 & 00w300 & 000w40 & \cdots \\ \cdots & 00000 & 00000 & w10000 & 0w2000 & 00w300 & \cdots \\ \cdots & 00000 & 00000 & 00000 & w10000 & 0w2000 & \cdots \\ \cdots & 00000 & 00000 & 00000 & 00000 & w10000 & \cdots \end{pmatrix} \begin{pmatrix} \vdots \\ a1 \\ b1 \\ c1 \\ d1 \\ e1 \\ a2 \\ b2 \\ c2 \\ d2 \\ e2 \\ a3 \\ b3 \\ c3 \\ d3 \\ e3 \\ \vdots \end{pmatrix}$$

[Equation 2]

In these arithmetic expressions, values of weighting coefficients w1, w2, w3, w4, and w5, respectively correspond to lengths of bars shown in FIGS. 14 and 15. Since the examples shown in FIGS. 14 and 15 assume the case where the designated aperture value by the user is minimum (maximum aperture size), if the designated aperture value by the user is the medium value (medium aperture size), the coefficients w1 and w5 of the weighting coefficients w1, w2, w3, w4, and w5 are set to extremely small values. Also, if the designated aperture value by the user is maximum (minimum aperture size), the coefficients w1, w2, w4, and w5 of the weighting coefficients w1, w2, w3, w4, and w5 are set to extremely small values.

In the image-capturing apparatus, an output value vector of the output values of all pixels of the image sensor 13 is multiplied by a weighting coefficient matrix, thereby forming the synthetic image data of the designated image plane. The size of the output value vector in the vertical direction corresponds to the total number of pixels of the image sensor 13. Also, the size of the weighting coefficient matrix in the horizontal direction corresponds to the size of the output value vector in the vertical direction. Further, the size of the weighting coefficient matrix in the vertical direction corresponds to the number of virtual pixels of the image data for synthesis.

The content of the weighting coefficient matrix is determined in accordance with the height Z of the designated image plane by the user, and the designated aperture value by the user. This determination is properly executed by the arithmetic processing circuit 15.

To facilitate the processing required for the determination, various types of weighting coefficient matrices may be previously stored in the memory 16 (see FIG. 16). In such a case, the arithmetic processing circuit 15 may select one of the weighting coefficient matrices in accordance with the designated image plane and the designated aperture value by the user.

In this image-capturing apparatus, the resolution of the image data may be designated by the user. The resolution may be designated through the user interface 18 in a manner similar to the designation of the image plane and the aperture value. The setting of the resolution of the image data may be performed such that the arithmetic processing circuit 15 interpolates or sub-samples (or skips) the output values of the pixel array 130 (and/or pixel values of virtual pixels of image data), if needed.

Actually, an efficient way of creating the entire image involves, after the position of the designated image plane (the distance from the microlens array plane) being determined, the image sizes of the pixel array located in the rear of the microlens being changed (increased as the distance is increased) in accordance with the position of the designated image plane, the image data sets related to the adjacent microlens being inverted, then the image data sets being mutually shifted by predetermined amounts, and the image data sets being added for synthesis. In such a case, the weighting of the addition for synthesis is changed in accordance with the designated aperture value (aperture condition).

Second Embodiment

A second embodiment is described below. This embodiment is an example of an image synthesis method for increasing the resolution of the image data. Note that this synthesis method may be applied only when the designated image plane is located in the vicinity of the front end of the synthesis range L (Z≈L).

Figure 17:
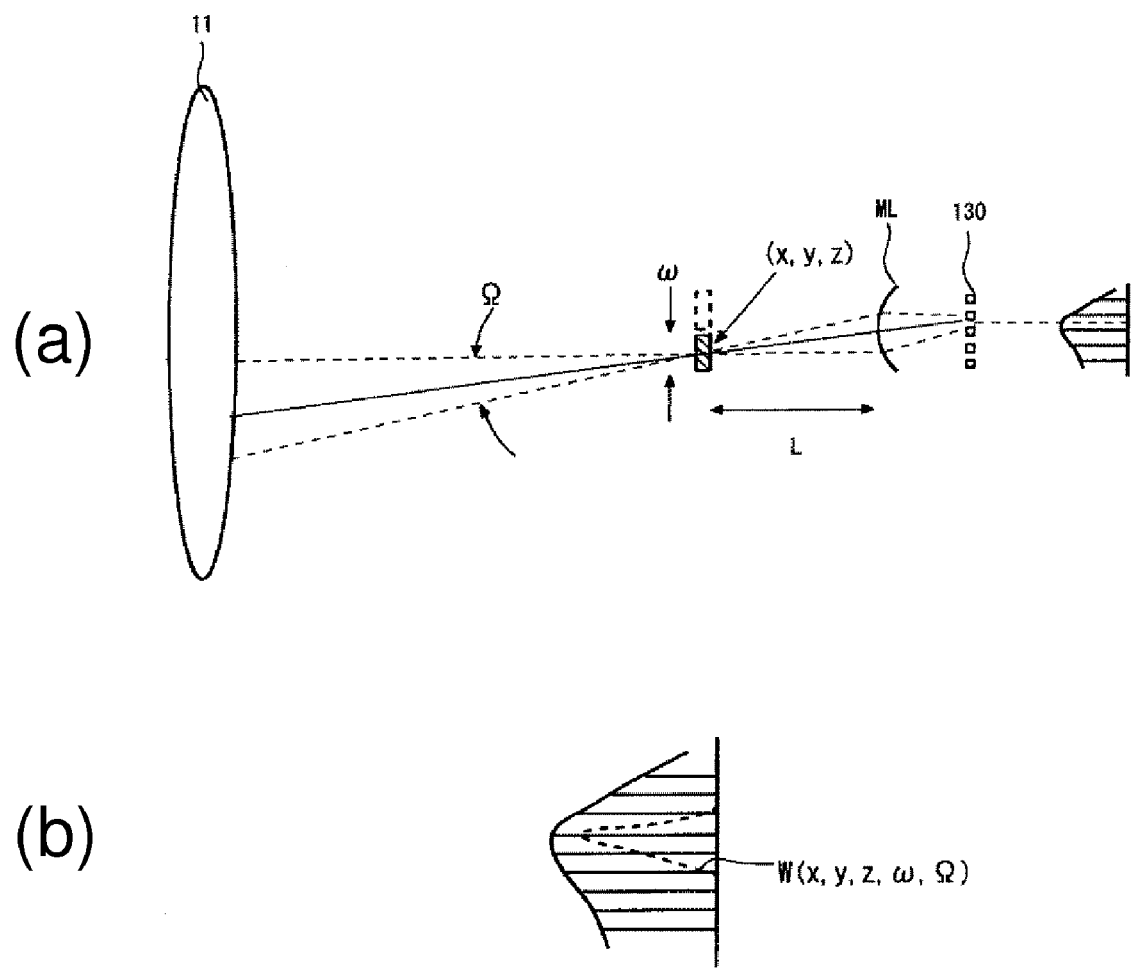
FIG. 17 is an illustration explaining an image synthesis method according to a second embodiment.

In this synthesis method, as shown in FIG. 17, the width of the virtual pixel is determined to a width ω (e.g., ω=P/2) which is smaller than the array pitch P of the microlens ML. To obtain the pixel value of the virtual pixel with the width ω, first, pixel interpolation is performed in the pixel array 130. Obtaining the pixel value of the virtual pixel with the width ω at the position located at the distance L from the microlens ML means obtaining a light amount at an intermediate position of an image which is formed by projecting the pixel of the pixel array 130 through the microlens ML toward the photographic lens 11 (imaging optical system). In particular, as shown in FIG. 17(b), an envelope function (solid line) of the pixel values is obtained through the interpolation, window functions (x, y, z, ω, Ω) (broken line) corresponding to ω are used, and accordingly, the pixel values of the virtual pixels are obtained as the sum of products of both functions (the envelope function and the window functions).

The bar graph shown at the right portion of the FIG. 17(a) represents a distribution of output values of the five pixels arrayed in the pixel array 130. When the interpolation processing is applied to the output values of the five pixels, a smooth distribution as indicated by a curved line can be obtained. Accordingly, for instance, as indicated by solid lines shown in FIG. 17(b), nine pixel values can be obtained, in a manner similar to a case where five or more pixels (hereinafter, assuming nine pixels) are arrayed in the pixel array 130.

Meanwhile, the bundles of rays emitted from the virtual pixel with the width ω are incident on the nine pixels with the light amount distribution as indicated by a dotted line in FIG. 17(b). The distribution curve W of the light amount distribution depends on the coordinates (X, Y, Z) of the virtual pixel, the width ω of the virtual pixel, and the solid angle Ω of the emitted bundles of rays due to the image formation relationship between the virtual pixel and the pixel array 130. Thus, by multiplying the pixel values of the nine pixels with the weighting coefficient corresponding to the distribution curve W (X, Y, Z, ω, W) and then adding the multiplied values, the light amount of the bundles of rays emitted form the virtual pixel can be obtained.

Such a weighted sum is obtained for bundles of rays emitted from the virtual pixels at various angles, and then the sum (or the weighted sum) of these values are obtained, thereby obtaining the pixel values of the virtual pixels. Further, this calculation is performed for all virtual pixels of the designated image plane, so that synthetic image data of the designated image plane can be formed with the resolution ω.

In the above-described synthesis method, the data which is the basis of the calculation is similar to that of the first embodiment (i.e., the data is the pixel outputs of all pixels of the image sensor 13). Therefore, since the weighting coefficient matrix is determined on the basis of the synthesis method, in a manner similar to the first embodiment, image data of the designated image plane can be collectively obtained merely by multiplying the output vector with the weighting coefficient matrix.

In this synthesis method, note that the size in the vertical direction of the weighting coefficient matrix is increased by an amount of the increased resolution (by an increase amount of the number of the virtual pixels).

Third Embodiment

A third embodiment is described below. In this embodiment, the image-capturing apparatus and the image synthesis method of the first embodiment are partly modified. Only the modified point is described here.

Figure 18:
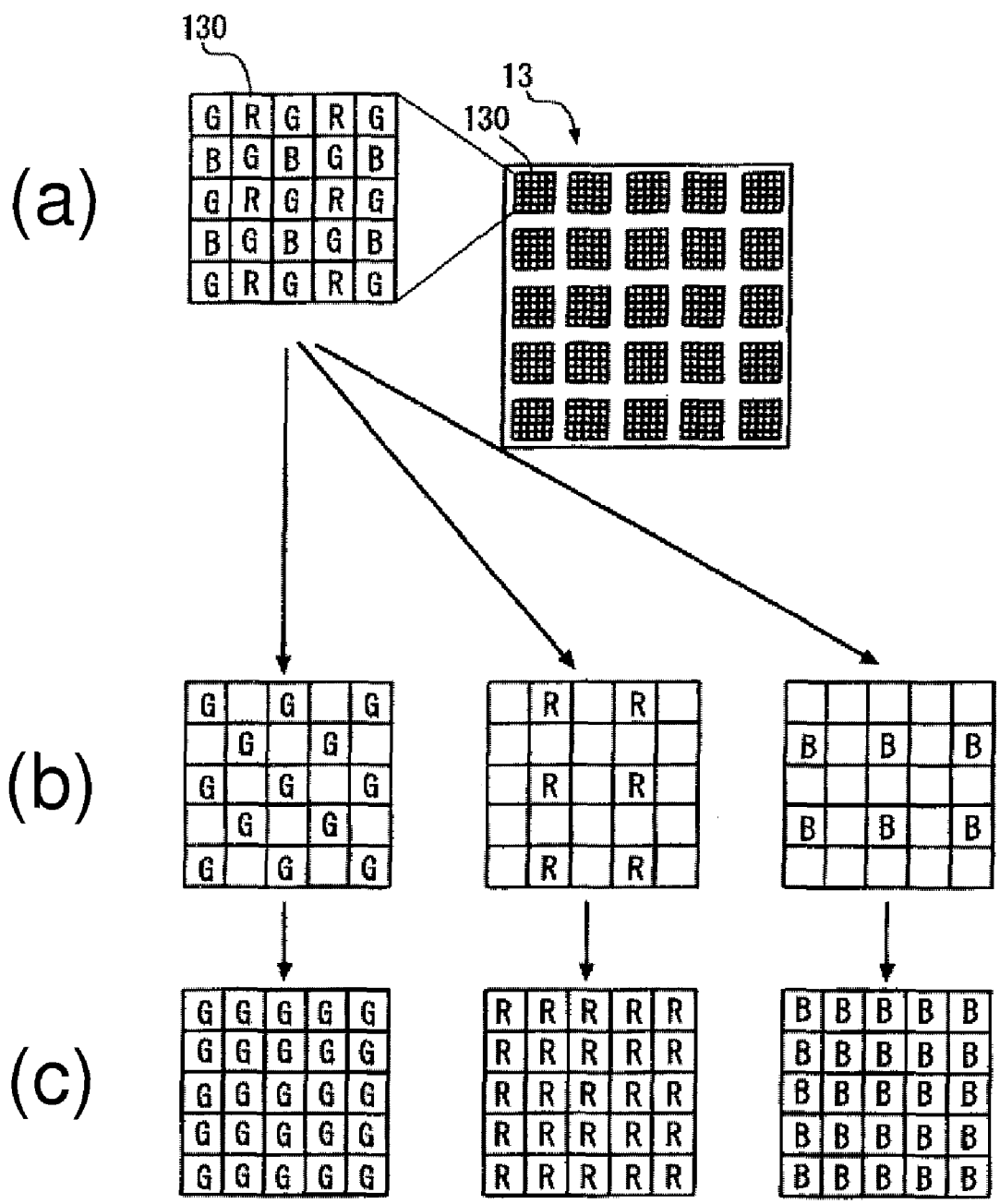
FIG. 18 is an illustration explaining an image-capturing apparatus and an image synthesis method according to a third embodiment.

Each pixel array 130 of the image sensor 13 of the image-capturing apparatus has a color filter array as shown in FIG. 18(a). The color filter array includes filters R that transmit only a red-light component among visible light entering the pixels of the pixel array 130, filters G that transmit only a green-light component, and filters B that transmit only a blue-color component, these filters R, G, B being arrayed in a Bayer pattern. The color filter array in this embodiment provides different spectral sensitivity characteristics for three colors, to the pixels. The Bayer pattern is a pattern in which the filters G are arranged on the pixels of the pixel array 130 in a checkered pattern, and the filters R and B are alternately arranged on the residual pixels.

Hereinafter, the pixel provided with the filter G is referred to as a "G pixel", the pixel provided with the filter R is referred to as an "R pixel", and the pixel provided with the filter B is referred to as a "B pixel". In this synthesis method, as shown in FIGS. 18(b) and 18(c), pixel interpolation is performed by a known interpolation method.

In particular, pixel outputs of twelve G pixels are interpolated to obtain pixel values of twenty-five G pixels for the entire pixel array 130. Also, pixel outputs of six R pixels are interpolated to obtain pixel values of twenty-five R pixels for the entire pixel array 130. In addition, pixel outputs for six B pixels are interpolated to obtain pixel values of twenty-five B pixels for the entire pixel array 130. The processing described in the above embodiment is applied to each surface, thereby providing a color image.

In the procedure of this synthesis method, since the pixel interpolation is performed separately for each color component, an interpolation error of the R pixels and that of the B pixels, both having a low array density, become larger than an interpolation error of the G pixels having a high array density. In order to solve this and improve the image quality, preferably, synthesis of all image data related to the designated image plane may be performed for the high-density green color (G color), then data of the red color (R surface) projected to the designated image plane without interpolation may be obtained, a difference Cr=R−G, between the value of R and that of the G (or the interpolation value of G) at the projected position may be obtained, and thereafter, the data of Cr may be interpolated. Thus, all image data of Cr is obtained, then all image data of the red color (R color) may be obtained by using R=Cr+G. The image data of the blue color (B surface) is formed in a similar manner.

While the color filter array of this image-capturing apparatus uses the Bayer pattern, other pattern may be used. For example, the filters G may be arranged in a striped pattern, and the filters R and B may be arranged alternately in columns between the columns of the filter G.

[Others]

In many cases, a transfer portion or the like is disposed at a gap between the photoreceptors of the photoelectric conversion elements which define the pixels of the pixel array 130, and hence, the gap does not become small. In this state, the bundle of rays entering the gap may be a loss. Therefore, in this image-capturing apparatus, as shown in FIG. 19(a), microlenses ML' having a diameter similar to the pixel pitch may be provided on the photoreceptors of the photoelectric conversion elements, so as to increase converging efficiency toward each pixel.

Figure 19:
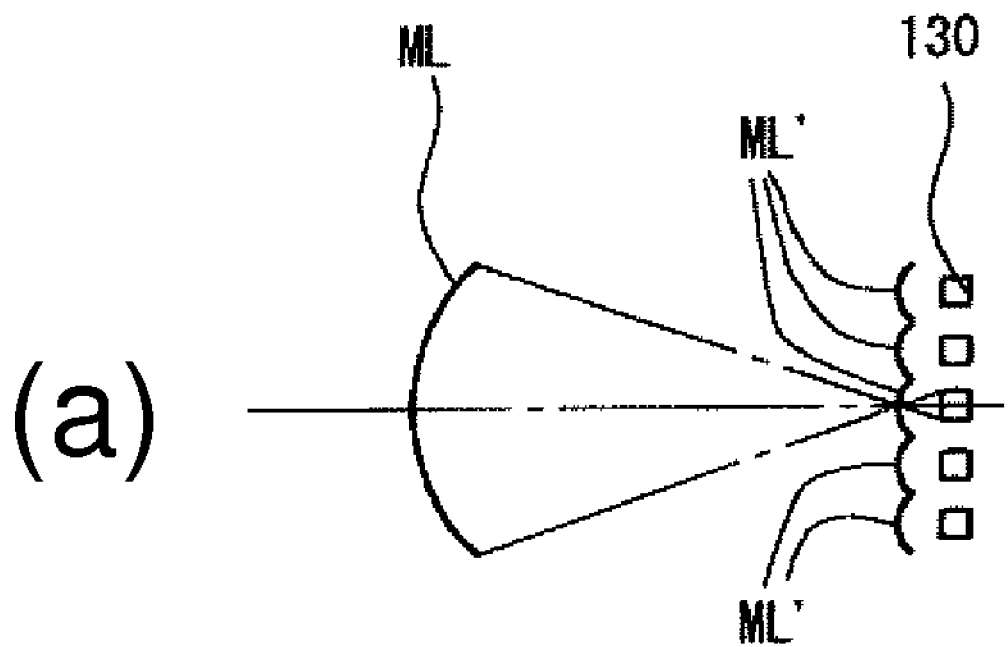
FIG. 19 is an illustration showing a pixel array 130 provided with microlenses ML'.
Figure 19:
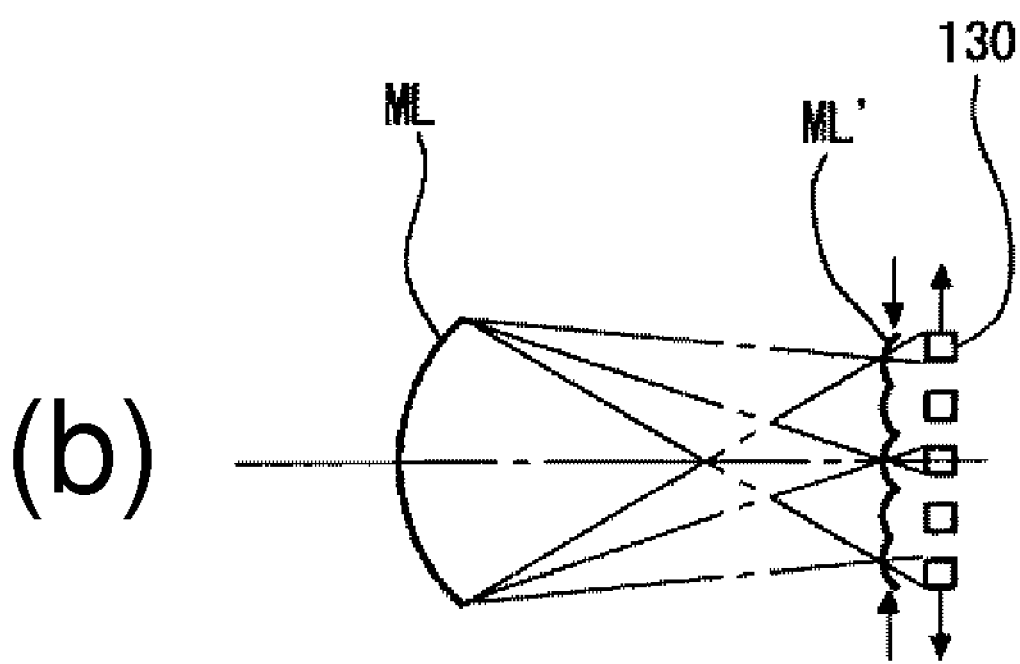

Since the converging efficiency to the pixel located at the edges of the pixel array 130 may be lower than that of other pixels, as indicated by an arrow in FIG. 19(b), the optical axis of the microlens in the second layer for defining the pixel may be preferably slightly shifted (deflected) toward the inner side from the center of the photoreceptor of the photoelectric conversion element, at the edges of the pixel array 130. Accordingly, the converging efficiency to the edge pixel may become close to the converging efficiency to the center pixel. Each microlens of the second-layer microlens array is deflected with respect to its photoelectric conversion element in accordance with the positional relationship between the microlenses of the microlens array 12 and the microlenses of the second-layer microlens array. Therefore, the deflection amount increases as the position of the microlens ML' comes away from the optical axis of the microlens ML.

Figure 20:
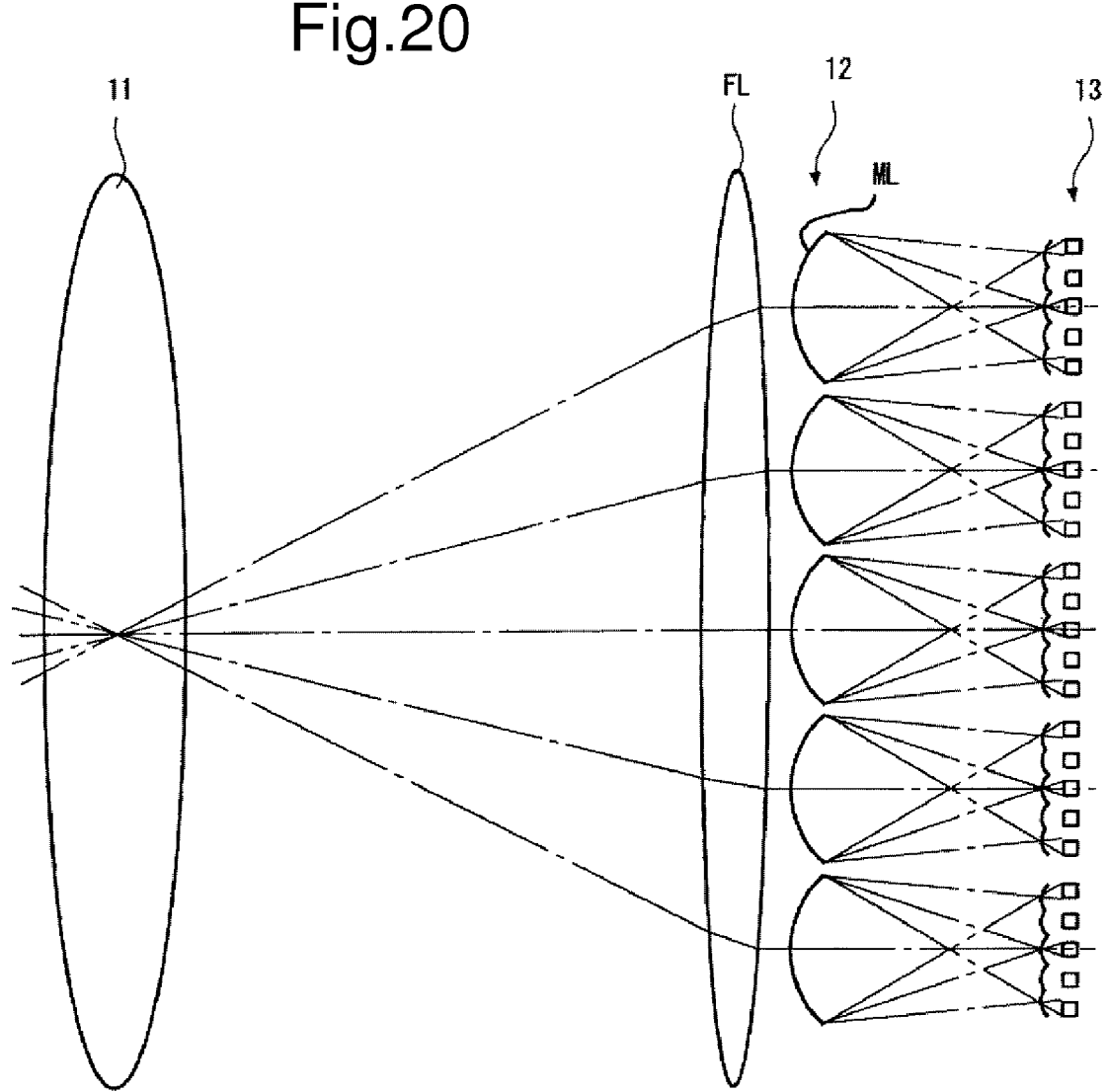
FIG. 20 is an illustration showing an image-capturing apparatus provided with a field lens FL.

Also, in this image-capturing apparatus, as shown in FIG. 20, a field lens FL may be disposed directly in the front of the microlens array 12. Disposing the field lens FL may control the angles of the bundles of rays incident on the microlens ML located at a high position of the image height thereof.

Also, in this image-capturing apparatus, while the image sensor 13 in which the plurality of partitioned pixel arrays 130 are two-dimensionally arranged (see FIG. 1), a typical image sensor in which pixels are evenly arranged may be prepared, and necessary portions of the image sensor may be selectively used.

The image-capturing apparatus may be provided with a display section such as a monitor. In such a case, synthetic image data, information associated with the image data, and the like, may be displayed on the display section.

Also, in this image-capturing apparatus, while the timing at which the user designates the image plane and the aperture value may be changed after shooting as desired, which is a large advantage, the designation before shooting may be of course reflected.

While the above description is based on the case where the designated image plane is one, the designated plane may be plural. The present invention features that a plurality of focal planes can be desirably provided after shooting. Since image data of the plurality of designated image planes represent three-dimensional image, the present invention can be used as a 3D image-capturing apparatus.

In the image-capturing apparatus, a shooting point may be designated instead of the image plane. In this case, the image-capturing apparatus is only required to form synthetic luminance data at the shooting point (designated point).

Items which may be designated by the user may include a "shooting range". In this case, the image-capturing apparatus is only required to form synthetic image data within the designated shooting range.

Also, in the image-capturing apparatus, while the whole processing related to the image synthesis is executed by the arithmetic processing circuit 15, apart of or the entire processing may be executed by an external computer of the image-capturing apparatus. In this case, a program for image synthesis is previously installed in the computer.

Also, the image-capturing apparatus having the above-mentioned configuration may capture an image, transfer the captured image to a personal computer, and the personal computer may execute the whole processing.

Figure 22:
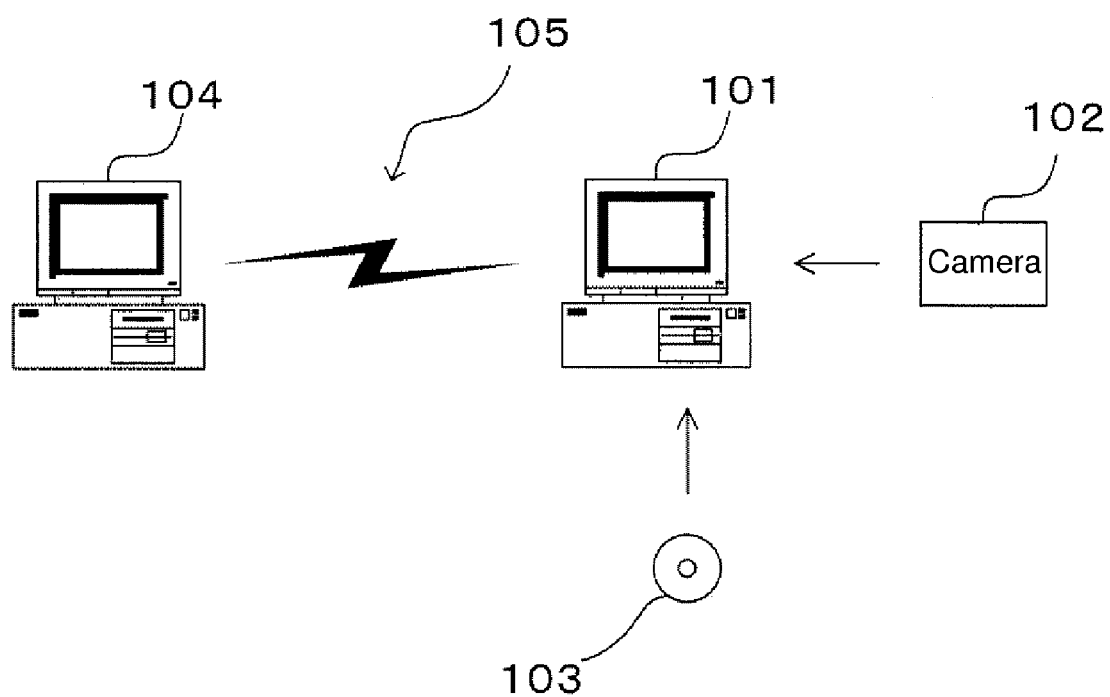
FIG. 22 is an illustration showing a configuration for processing with a personal computer.

FIG. 22 is an illustration showing a configuration for processing with a personal computer 101. The personal computer 101 is connected to a digital camera 102 as the above-described image-capturing apparatus, and acquires image data captured by the digital camera 102. Alternatively, the image data captured by the digital camera 102 may be acquired using a recording medium 103, such as a CD-ROM, or other computer 104. The personal computer 101 is connected to the computer 104 through the Internet or other electric telecommunication line 105.

A program executed by the personal computer 101 is provided by a recording medium such as a CD-ROM, or by other computer through the Internet, or other electric telecommunication line, and is installed in the personal computer 101, in a manner similar to the configuration shown in FIG. 21. The personal computer 101 has a CPU (not shown) and a peripheral circuit (not shown). The CPU executes the installed program.

In the case where the program is provided through the Internet or the other electric telecommunication line, the program is converted into a signal on a carrier wave that carries the signal through a transmission medium, i.e., the electric telecommunication line. In this way, the program is supplied as a computer program product in various forms of, for example, a recording medium and a carrier wave, to be readable by the computer.

Figure 23:
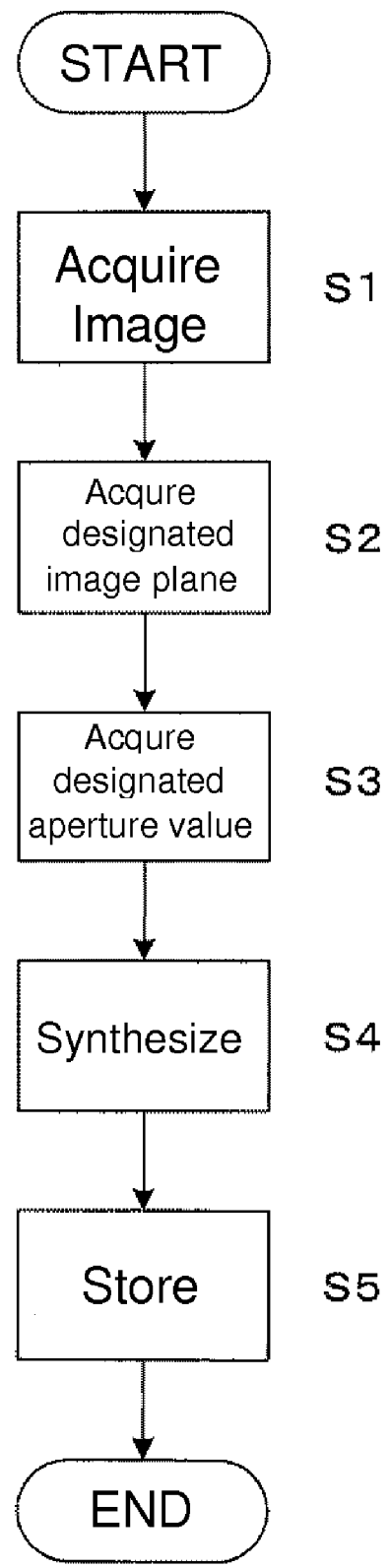
FIG. 23 is a flowchart showing processing of a program executed by a personal computer.

FIG. 23 is a flowchart showing the processing of the program executed by the personal computer 101. In step S1, image data is acquired (obtained) from the digital camera 102.

The image data acquired from the digital camera 102 is image data composed of outputs of all pixels of the image sensor 13. In step S2, an image plane, which was designated by the user using an input device such as a monitor or a keyboard of the personal computer 101, is acquired. In step S3, a designated aperture value is acquired in a similar manner.

In step S4, synthesis processing is performed on the basis of the image data acquired in step S1, and the designated image plane as well as the designated aperture value. In the synthesis processing, the personal computer 101 performs the synthesis processing, which is executed by the arithmetic processing circuit 15 in the above-described embodiment, using a software. In step S5, the synthetic image data is stored in hard disk (not shown), or the like. With the above procedure, the personal computer can provide an image focused at a desired distance after shooting by using data obtained by one shooting.

While various embodiments and modifications are described above, the present invention is not limited to the above configurations. Other embodiments made within the scope of the technical idea of the present invention may be included within the present invention.

The disclosure of the following priority application is hereby incorporated by reference herein.

Japanese Patent Application No. 2005-183729 (filed Jun. 23, 2005).

The invention claimed is:

1. An image-capturing apparatus comprising:
an imaging optical system;
a microlens array having a plurality of microlenses two-dimensionally arrayed with a predetermined pitch in a vicinity of a focal plane of the imaging optical system;
a photoreceptor array having a plurality of photoreceptors for each of the microlenses, each of the photoreceptors receiving bundles of rays passing through one of different regions at an exit-pupil of the imaging optical system; and
an arithmetic unit that generates a synthetic image in an image plane at a desired position optionally set in an optical path of the imaging optical system, based on photoreception signals output from the photoreceptor array,
wherein the arithmetic unit generates the synthetic image in the image plane at the desired position optionally set in the optical path of the imaging optical system, by obtaining a light amount of bundles of rays incident on a region a size of which is optionally set at the desired position, based on the desired position, the size of the region, a solid angle of bundles of rays incident on the region corresponding to a desired aperture, and photoreception signals output from the plurality of photoreceptors for each of the microlenses.

2. An image-capturing apparatus according to claim 1, wherein
a pixel of the synthetic image corresponds to the region the size of which has been optionally set.

3. An image-capturing apparatus according to claim 1, wherein
the arithmetic unit obtains the light amount of the bundles of rays incident on the region the size of which is optionally set, based on a window function with parameters of the desired position, the size of the region and the solid angle, and the photoreception signals output from the plurality of photoreceptors for each of the microlenses.

4. An image-capturing apparatus according to claim 1, wherein
the arithmetic unit obtains a larger number of photoreception signals by performing interpolation processing on photoreception signals output from the plurality of photoreceptors for each of the microlenses than a number of the photoreception signals output from the plurality of photoreceptors for each of the microlenses, and obtains the light amount of the bundles of rays incident on the region the size of which is optionally set, based on the obtained larger number of photoreception signals.

5. An image-capturing apparatus comprising:
an imaging optical system;
a microlens array having a plurality of microlenses two-dimensionally arrayed with a predetermined pitch in a vicinity of a focal plane of the imaging optical system;
a photoreceptor array having a plurality of photoreceptors for each of the microlenses, each of the photoreceptors receiving bundles of rays passing through one of different regions at an exit-pupil of the imaging optical system; and
an arithmetic unit that generates a synthetic image in an image plane at a desired position optionally set in an optical path of the imaging optical system, based on photoreception signals output from the photoreceptor array,
wherein the arithmetic unit obtains a larger number of photoreception signals by performing interpolation processing on photoreception signals output from the plurality of photoreceptors for each of the microlenses than a number of the photoreception signals output from the plurality of photoreceptors for each of the microlenses.

6. An image-capturing apparatus comprising:
an imaging optical system;
a microlens array having a plurality of microlenses two-dimensionally arrayed with a predetermined pitch in a vicinity of a focal plane of the imaging optical system;
a photoreceptor array having a plurality of photoreceptors for each of the microlenses, each of the photoreceptors receiving bundles of rays passing through one of different regions at an exit-pupil of the imaging optical system; and
an arithmetic unit that generates a synthetic image in an image plane at a desired position optionally set in an optical path of the imaging optical system, based on photoreception signals output from the photoreceptor array,
wherein the arithmetic unit generates the synthetic image by inverting photoreception signals output from the plurality of photoreceptors for each of the microlenses, shifting inverted photoreception signals output from the plurality of photoreceptors for each of microlenses adjacent to each other by a predetermined amount according to the desired position and then superposing the shifted inverted photoreception signals.

7. An image-capturing apparatus comprising:

an imaging optical system;

a microlens array having a plurality of microlenses two-dimensionally arrayed with a predetermined pitch in a vicinity of a focal plane of the imaging optical system;

a photoreceptor array having a plurality of photoreceptors for each of the microlenses, each of the photoreceptors receiving bundles of rays passing through one of different regions at an exit-pupil of the imaging optical system; and an arithmetic unit that generates a synthetic image in an image plane at a desired position optionally set in an optical path of the imaging optical system, based on photoreception signals output from the photoreceptor array, wherein:

a color filter having a plurality of color components, in which a color component corresponds to a photoreceptor, is provided on the photoreceptor array;

the arithmetic unit generates a synthetic image of a first color component, which is the highest density among the plurality of color components, in the image plane at the desired position, based on photoreception signals output from photoreceptors of the first color component; and the arithmetic unit generates photoreception signals of the first color component at positions corresponding to photoreceptors of a second color component, which is different from the first color component, in the synthetic image through interpolation processing using photoreception signals of the first color component in the synthetic image.

8. An image-capturing apparatus according to claim 7, wherein:

the arithmetic unit generates a synthetic image of a second color component in the image plane at the desired position, based on photoreception signals output from photoreceptors of the second color component;

the arithmetic unit generates difference signals of a photoreception signal of the first color component and a photoreception signal of the second color component in the synthetic image of the second color component by using photoreception signals of the first color component of the synthetic image of the first color component having undergone interpolation processing;

the arithmetic unit generates the difference signals at positions, where the difference signals are not generated, through interpolation processing using the generated difference signals;

the arithmetic unit obtains interpolated photoreception signals of the second color component based on the difference signals and the photoreception signals of the first color component both having undergone interpolation processing.

9. An image-capturing apparatus according to claim 8, wherein:

the color filter having the plurality of color components is a color filter with a Bayer pattern having a red color component, a green color component and a blue color component; the first color component is the green color component; and the second color component is the red color component or the blue color component.

* * * * *